US011232810B2

(12) United States Patent
Nakayama et al.

(10) Patent No.: US 11,232,810 B2
(45) Date of Patent: Jan. 25, 2022

(54) VOICE EVALUATION METHOD, VOICE EVALUATION APPARATUS, AND RECORDING MEDIUM FOR EVALUATING AN IMPRESSION CORRELATED TO PITCH

(71) Applicant: FUJITSU LIMITED, Kawasaki (JP)

(72) Inventors: Sayuri Nakayama, Kawasaki (JP); Taro Togawa, Kawasaki (JP); Takeshi Otani, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 376 days.

(21) Appl. No.: 16/354,260

(22) Filed: Mar. 15, 2019

(65) Prior Publication Data

US 2019/0214039 A1 Jul. 11, 2019

Related U.S. Application Data

(63) Continuation of application No. PCT/JP2018/013867, filed on Mar. 30, 2018.

(30) Foreign Application Priority Data

Jun. 23, 2017 (JP) .............................. JP2017-123588

(51) Int. Cl.
*G09B 15/00* (2006.01)
*G06F 16/68* (2019.01)
(Continued)

(52) U.S. Cl.
CPC .............. *G10L 25/90* (2013.01); *G10L 15/22* (2013.01); *G10L 25/60* (2013.01); *G10L 25/63* (2013.01)

(58) Field of Classification Search
CPC ................................. G09B 15/00; G06F 16/68
(Continued)

(56) References Cited

U.S. PATENT DOCUMENTS

2010/0063952 A1* 3/2010 Sassa ..................... G06F 16/68
706/48
2013/0080169 A1 3/2013 Harada et al.
2018/0357920 A1* 12/2018 Terashima ............. G09B 15/00

FOREIGN PATENT DOCUMENTS

JP 2006-267464 10/2006
JP 2006-267465 10/2006
(Continued)

OTHER PUBLICATIONS

International Search Report attached with the Written Opinion of the International Searching Authority, mailed in connection with PCT/JP2018/013867, dated Jun. 12, 2018, with English Translation (8 pages).

(Continued)

*Primary Examiner* — Farzad Kazeminezhad
(74) *Attorney, Agent, or Firm* — Fujitsu Patent Center

(57) ABSTRACT

A non-transitory computer-readable recording medium storing a program that causes a computer to execute a process for evaluating a voice, the process includes analyzing a voice signal to detect a pitch frequency; selecting an evaluation target region to be evaluated in the detected pitch frequency based on a distribution of a detection rate of the detected pitch frequency; and evaluating a voice based on the distribution of the detection rate and the selected evaluation target region. An Impression of the voice using a correction to the distribution is evaluated and determined as good when a spread of the corrected distribution is larger than or equal to a certain threshold.

17 Claims, 17 Drawing Sheets

(51) Int. Cl.
  *G10L 25/90*  (2013.01)
  *G10L 15/22*  (2006.01)
  *G10L 25/60*  (2013.01)
  *G10L 25/63*  (2013.01)

(58) Field of Classification Search
  USPC .......................................................... 706/48
  See application file for complete search history.

(56) References Cited

FOREIGN PATENT DOCUMENTS

| | | |
|---|---|---|
| JP | 2013-72979 | 4/2013 |
| JP | 2015-87557 | 5/2015 |

OTHER PUBLICATIONS

M.K.P. Kumar et al., "Single-channel speech separation using empirical mode decomposition and multi pitch information with estimation of number of speakers", International Journal of Speech Technology, Kluwer, Dordrecht, NL, vol. 20, No. 1, pp. 109-125, Nov. 29, 2016. [retrieved on Nov. 29, 2016].

EESR—The Extended European Search Report of European Patent Application No. 18821009.0 dated May 28, 2020. US2013/0080169 cited in the EESR was previously submitted in the IDS filed on Mar. 15, 2019.

* cited by examiner

FIG. 9

| ATTRIBUTE INFORMATION || STANDARD DEVIATION (SPREAD OF HISTOGRAM) |
| --- | --- | --- |
| GENDER INFORMATION | VOICE HEIGHT INFORMATION | |
| MALE | LOW | STANDARD DEVIATION IN NORMAL TIME CORRESPONDING TO GENDER INFORMATION "MALE" AND VOICE HEIGHT INFORMATION "LOW" |
| MALE | HIGH | STANDARD DEVIATION IN NORMAL TIME CORRESPONDING TO GENDER INFORMATION "MALE" AND VOICE HEIGHT INFORMATION "HIGH" |
| FEMALE | LOW | STANDARD DEVIATION IN NORMAL TIME CORRESPONDING TO GENDER INFORMATION "FEMALE" AND VOICE HEIGHT INFORMATION "LOW" |
| FEMALE | HIGH | STANDARD DEVIATION IN NORMAL TIME CORRESPONDING TO GENDER INFORMATION "FEMALE" AND VOICE HEIGHT INFORMATION "HIGH" |

VOICE EVALUATION METHOD, VOICE EVALUATION APPARATUS, AND RECORDING MEDIUM FOR EVALUATING AN IMPRESSION CORRELATED TO PITCH

CROSS-REFERENCE TO RELATED APPLICATION

This application is a continuation application of International Application PCT/JP2018/013867 filed on Mar. 30, 2018 and designated the U.S., the entire contents of which are incorporated herein by reference. The International Application PCT/JP2018/013867 is based upon and claims the benefit of priority of the prior Japanese Patent Application No. 2017-123588, filed on Jun. 23, 2017, the entire contents of which are incorporated herein by reference.

FIELD

The embodiments discussed herein are related to a voice evaluation method, a voice evaluation apparatus, and a recording medium.

BACKGROUND

Recently, many companies have tended to emphasize customer satisfaction, and it is desirable to grasp impression of a responder and feeling of a customer during a conversation between the correspondent and the customer. The impression of the responder and the feeling of the customer often appear in voice.

For example, in the related art, there is an apparatus that determines the impression of the voice, based on a vertical width of a pitch frequency of the voice during the conversation. FIG. 15 is a diagram illustrating a technique of related art. In a graph 5 of FIG. 15, a horizontal axis denotes time and a vertical axis denotes a frequency.

In the related art, it is determined that the voice having a pitch frequency of a large vertical width is clear (bright) and the voice having a pitch frequency of a small vertical width is unclear (dark). The vertical width of the pitch frequency is a difference between a maximum value and a minimum value of the pitch frequency during a certain period.

For example, in the related art, since a vertical width 5a is large during a period T1 of the graph 5, it is determined that the impression of the voice is clear. In the related art, since a vertical width 5b is small during a period T2 of the graph 5, it is determined that the impression of the voice is unclear.

Japanese Laid-open Patent Publication No. 2015-87557 and Japanese Laid-open Patent Publication No. 2006-267465 are examples of the related art.

However, the above-described technique of related art has a problem that voice may not be accurately evaluated.

In a process of detecting a pitch frequency, a half pitch or a double pitch may be erroneously calculated in terms of characteristics. Accordingly, as in the related art, if clearness or unclearness of a voice is simply determined by a magnitude of a vertical width of the pitch frequency, the voice may not accurately be evaluated in some cases.

FIG. 16 is a diagram illustrating a graph in a case where an accurate pitch frequency is calculated. In a graph 6 of FIG. 16, a horizontal axis denotes time and a vertical axis denotes a frequency. The graph 6 illustrates a case where an accurate pitch frequency is calculated. In the graph 6, since a vertical width 6a of the pitch frequency is small, it can be determined that the voice is unclear.

FIG. 17 is a diagram illustrating a graph in a case where a half pitch/a double pitch is calculated. In a graph 7 of FIG. 17, a horizontal axis denotes time and a vertical axis denotes a frequency. The graph 7 illustrates a case where the half pitch/the double pitch are calculated erroneously. In the graph 7, a vertical width 7a of the pitch frequency is increased, and it is determined that the voice is clear regardless of the fact that the voice is actually unclear. Under such circumstances, it is desirable that accurately evaluating of a voice is capable.

SUMMARY

According to an aspect of the embodiments, a non-transitory computer-readable recording medium storing a program that causes a computer to execute a process for evaluating a voice, the process includes analyzing a voice signal to detect a pitch frequency; selecting an evaluation target region to be evaluated in the detected pitch frequency based on a distribution of a detection rate of the detected pitch frequency; and evaluating a voice based on the distribution of the detection rate and the selected evaluation target region.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a diagram illustrating an example of a data structure of a normal time distribution table according to the second embodiment;

DESCRIPTION OF EMBODIMENTS

Hereinafter, embodiments of a recording medium storing a voice evaluation program, a voice evaluation method, and a voice evaluation apparatus disclosed in the present application will be described in detail with reference to the drawings. The present disclosure is not limited by the embodiments.

First Embodiment

Figure 1:
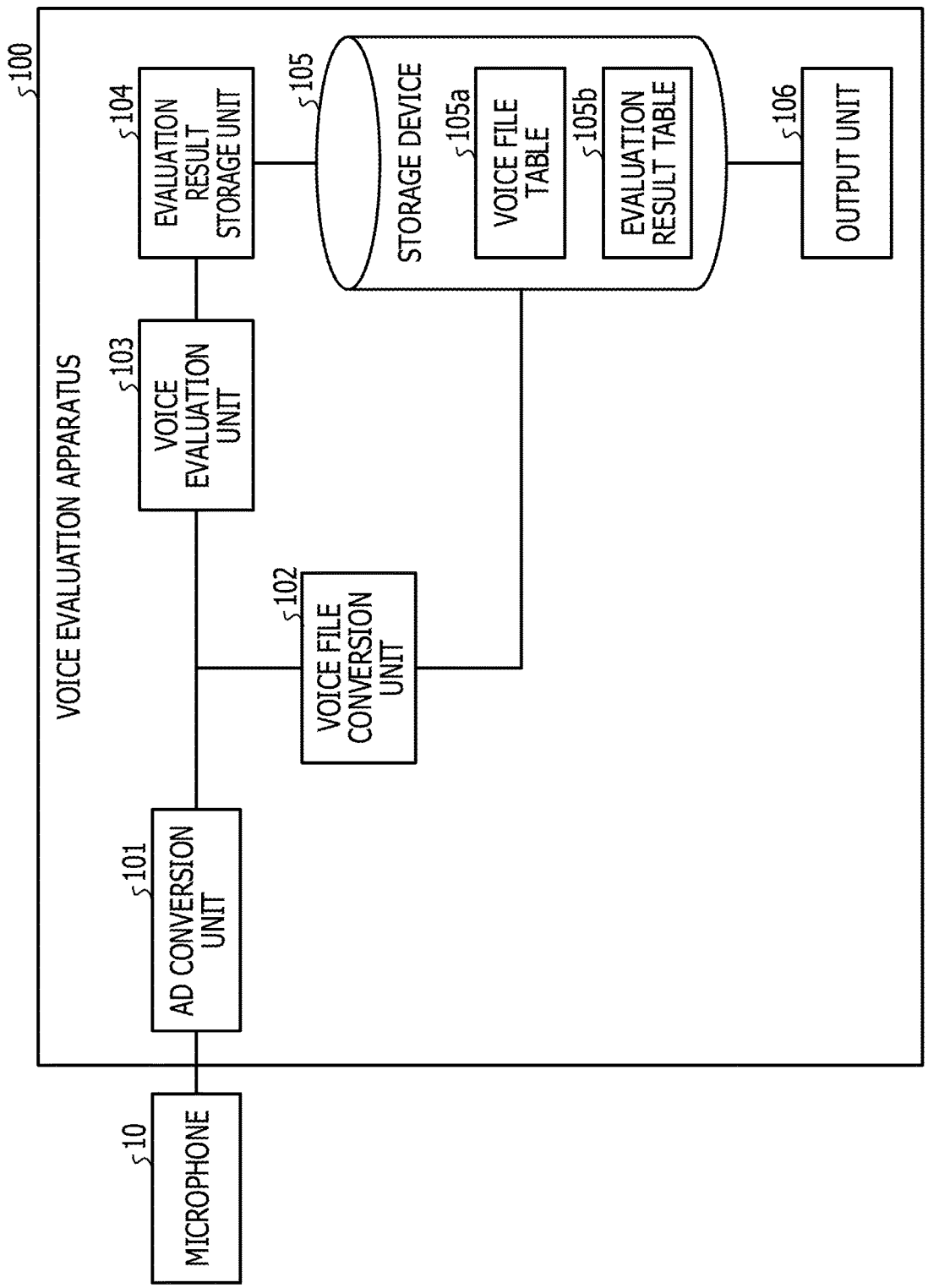
FIG. 1 is a functional block diagram illustrating a configuration of a voice evaluation apparatus according to a first embodiment.

FIG. 1 is a functional block diagram illustrating a configuration of a voice evaluation apparatus according to a first embodiment. As illustrated in FIG. 1, the voice evaluation apparatus 100 is connected to a microphone 10 that collects voices of a speaker (not illustrated). The microphone 10 outputs a signal of the collected voices to the voice evaluation apparatus 100. In the following description, the signal of the voices collected by the microphone 10 is referred to as a "voice signal".

The voice evaluation apparatus 100 includes an AD (Analog-to-Digital) conversion unit 101, a voice file conversion unit 102, a voice evaluation unit 103, an evaluation result storage unit 104, a storage device 105, and an output unit 106.

The AD conversion unit 101 is a processing unit that receives a voice signal from the microphone 10 and performs an AD conversion. For example, the AD conversion unit 101 converts a voice signal (analog signal) into a voice signal (digital signal). The AD conversion unit 101 outputs the voice signal (digital signal) to the voice file conversion unit 102 and the voice evaluation unit 103. In the following description, the voice signal (digital signal) output from the AD conversion unit 101 is simply referred to as a voice signal.

The voice file conversion unit 102 is a processing unit that converts the voice signal into a voice file by using a predetermined voice file format. For example, the voice file includes information that associates each time with a strength of the voice signal. The voice file conversion unit 102 stores the voice file in a voice file table 105a of the storage device 105. In the following description, for the sake of convenience, information on a relationship between the time and the strength of the voice signal which are included in the voice file is merely described as a voice signal.

The voice file conversion unit 102 acquires speaker information from an input apparatus (not illustrated) and attaches the speaker information to the voice file. For example, the speaker information is information for uniquely identifying a speaker.

The voice evaluation unit 103 is a processing unit that evaluates impression of the voice of the speaker, based on the voice signal. For example, an evaluation result of the impression of the voice of the speaker is either "good impression", "normal impression", "bad impression". The voice evaluation unit 103 outputs the speaker information and information of the evaluation result to the evaluation result storage unit 104.

The evaluation result storage unit 104 is a processing unit that stores the speaker information and the evaluation result in an evaluation result table 105b of the storage device 105 in association with each other.

The storage device 105 stores the voice file table 105a and the evaluation result table 105b. The storage device 105 corresponds to a semiconductor memory element such as a RAM (Random Access Memory), a ROM (Read Only Memory) or a flash memory (Flash Memory), or a storage apparatus such as a HDD (Hard Disk Drive).

The voice file table 105a is a table for storing a voice file output from the voice file conversion unit 102. The evaluation result table 105b is a table for associating the speaker information stored by the evaluation result storage unit 104 with the evaluation result.

The output unit 106 is a processing unit that displays the evaluation result by outputting the evaluation result table 105b stored in the storage device 105 to a display apparatus. The output unit 106 may output the voice file stored in the voice file table 105a to another external apparatus.

The AD conversion unit 101, the voice file conversion unit 102, the voice evaluation unit 103, the evaluation result storage unit 104, and the output unit 106, which are illustrated in FIG. 1, correspond to a predetermined control unit (not illustrated). For example, the control unit can be realized by a CPU (Central Processing Unit), an MPU (Micro Processing Unit), or the like. The control unit can be realized by hard-wired logic such as an ASIC (Application Specific Integrated Circuit) or a FPGA (Field Programmable Gate Array).

Figure 2:
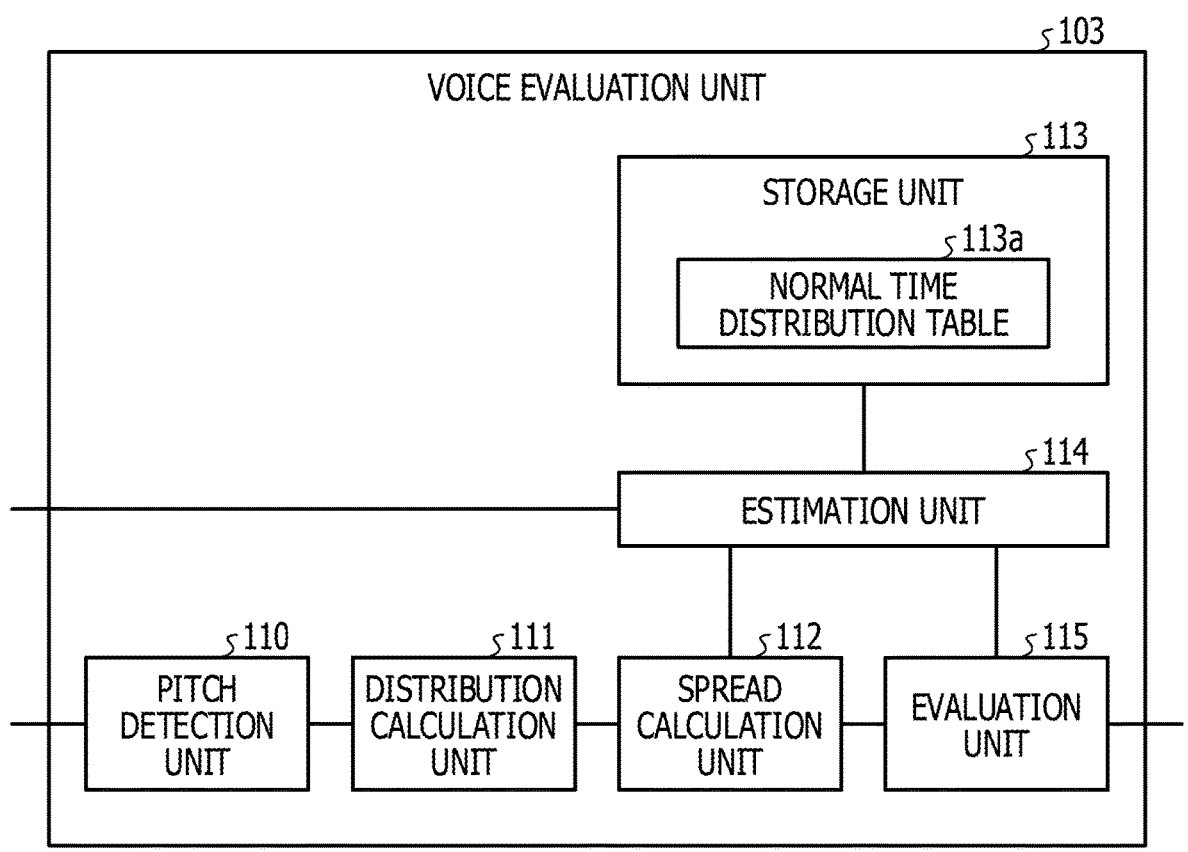
FIG. 2 is a functional block diagram illustrating a configuration of a voice evaluation unit according to the first embodiment.

Subsequently, a configuration of the voice evaluation unit 103 illustrated in FIG. 1 will be described. FIG. 2 is a functional block diagram illustrating the configuration of the voice evaluation unit according to the first embodiment. As illustrated in FIG. 2, the voice evaluation unit 103 includes a pitch detection unit 110, a distribution calculation unit 111, a spread calculation unit 112, a storage unit 113, an estimation unit 114, and an evaluation unit 115.

The pitch detection unit 110 is a processing unit that detects a pitch frequency by analyzing a frequency of the voice signal of the voice file. The pitch frequency corresponds to a fundamental frequency of the voice signal. The pitch detection unit 110 outputs information on the pitch frequency to the distribution calculation unit 111.

The pitch detection unit 110 may detect an utterance section from the voice signal of the voice file and may detect a pitch frequency based on the voice signal in the utterance section. For example, the pitch detection unit 110 sets time when a strength of the voice signal is greater than or equal to a threshold as a start time of the utterance section. The pitch detection unit 110 sets the time at which the strength of the voice signal is less than the threshold value after the start time as the end time of the utterance section. The pitch detection unit 110 sets a section from the start time to an end time as the utterance section.

The pitch detection unit 110 detects the pitch frequency for each section by dividing the voice signal in the utterance section into a plurality of sections each having a predetermined time width and performing frequency analysis on the voice signal for each section. The pitch detection unit 110 outputs the pitch frequency of each of the plurality of sections included in the utterance section to the distribution calculation unit 111.

For example, the pitch detection unit 110 may detect the pitch frequency, based on a document (D. Talkin, "A Robust Algorithm for Pitch Tracking (RAPT)", in Speech Coding & amp; Synthesis, W. B. Kleijn and K. K. Pailwal (Eds.), Elsevier, pp. 495-518, 1995).

Figure 3:
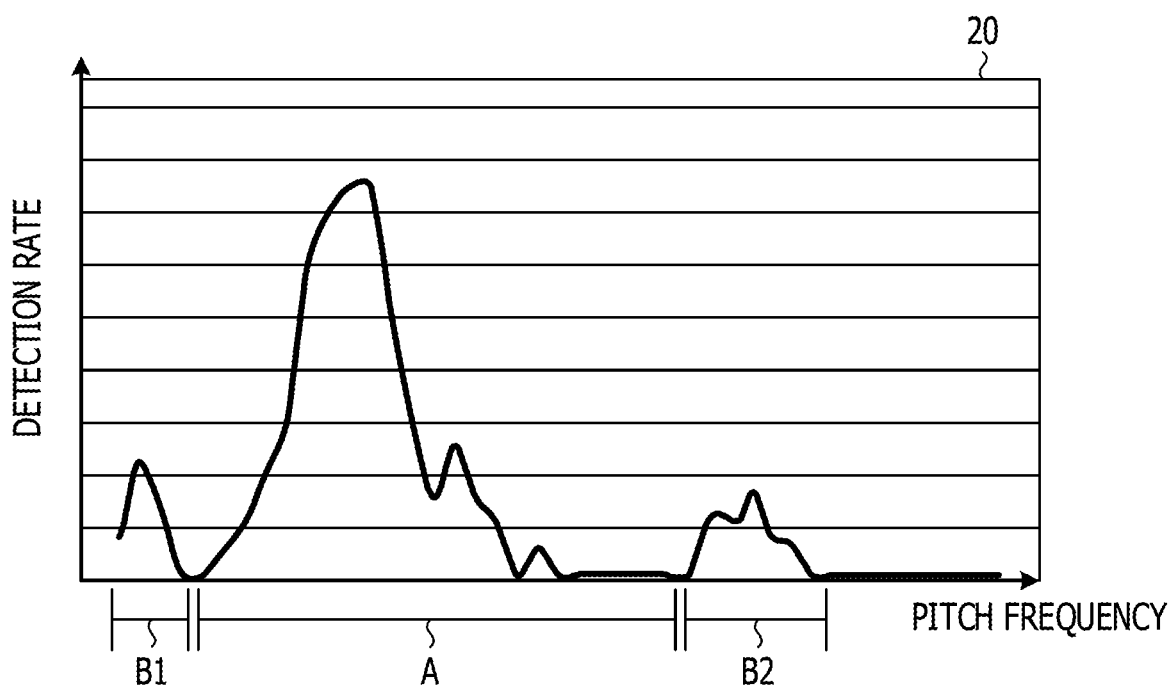
FIG. 3 is a diagram illustrating an example of a histogram.

The distribution calculation unit 111 is a processing unit that calculates a histogram based on a plurality of pitch frequencies within a predetermined section. FIG. 3 is a diagram illustrating an example of the histogram. A horizontal axis of a histogram 20 illustrated in FIG. 3 is an axis corresponding to the pitch frequency, and a vertical axis is an axis corresponding to a detection rate. The histogram 20 corresponds to a distribution of the detection rate of the pitch frequency.

The distribution calculation unit 111 specifies a central portion and a tail portion of the histogram 20 by executing the following process. The distribution calculation unit 111 calculates an average $\mu$ of the respective pitch frequencies within a predetermined section. The distribution calculation unit 111 calculates a standard deviation a of the respective pitch frequencies within the predetermined section. For example, the distribution calculation unit 111 sets the central portion of the histogram 20 as "$\mu-\sigma$ to $\mu+\sigma$". The distribution calculation unit 111 sets the tail portion of the histogram 20 as "$(\mu-\sigma)/2$ to $(\mu+\sigma)/2$", "$2\times(\mu-\sigma)/2$ to $2\times(\mu+\sigma)$".

For example, in FIG. 3, a range A of the pitch frequency becomes the central portion, and ranges B1 and B2 become the tail portion. The distribution calculation unit 111 may calculate the central portion and the tail portion of the histogram 20 by executing a process other than the above-described process. The distribution calculation unit 111 may specify a section between a start point and an end point of a central mountain from an outline of the histogram 20 as the central portion and may specify a range other than the central portion as the tail portion.

The distribution calculation unit 111 outputs information on the plurality of pitch frequencies within the predetermined section or information on the histogram 20, information on the central portion, and information on the tail portion to the spread calculation unit 112.

The spread calculation unit 112 is a processing unit that calculates a spread of the histogram 20 after correcting the histogram 20. As will be described below, the spread of the corrected histogram 20 corresponds to a standard deviation based on the corrected pitch frequency.

For example, the spread calculation unit 112 classifies a plurality of pitch frequencies within the predetermined section into a pitch frequency corresponding to the central portion and a pitch frequency corresponding to the tail portion. The spread calculation unit 112 corrects each pitch frequency in the central portion by multiplying each pitch frequency corresponding to the central portion by a weight "$\alpha$", respectively. A value of $\alpha$ is set to, for example, "1", but an administrator may change the value appropriately.

The spread calculation unit 112 corrects each pitch frequency of the tail portion by multiplying each pitch frequency corresponding to the tail portion by a weight "$\beta$", respectively. A value of $\beta$ is set to, for example, "0.1", but the administrator may change the value appropriately.

The spread calculation unit 112 calculates a standard deviation of the pitch frequency, based on the respective corrected pitch frequencies of the central portion and the tail portion. As such, the standard deviation of the pitch frequency calculated based on the respective corrected pitch frequencies of the central portion and the tail portion corresponds to a spread of the corrected histogram 20. The spread calculation unit 112 outputs information on the standard deviation corresponding to the spread of the corrected histogram 20 to the estimation unit 114 and the evaluation unit 115.

The storage unit 113 includes a normal time distribution table 113a. The storage unit 113 corresponds to a semiconductor memory apparatus such as a RAM, a ROM or a flash memory, or a storage apparatus such as an HDD.

The normal time distribution table 113a is a table for holding information on the spread of the histogram of the speaker in a normal time. For example, the normal time distribution table 113a associates speaker information with a standard deviation. The standard deviation of the normal time distribution table 113a is estimated by the estimation unit 114 which will be described below.

The estimation unit 114 is a processing unit that estimates the standard deviation of the speakers in a normal time. The estimation unit 114 stores the speaker information and the standard deviation in the normal time in the normal time distribution table 113a in association with each other. The estimation unit 114 acquires speaker information attached to the voice file.

The estimation unit 114 acquires the speaker information and performs an "initial operation" in a case where the standard deviation corresponding to the speaker information is not stored in the normal time distribution table 113a. Meanwhile, in a case where the standard deviation corresponding to the speaker information is stored in the normal time distribution table 113a, the estimation unit 114 performs an "update operation". In the following description, the initial operation and the update operation will be sequentially described.

The initial operation performed by the estimation unit 114 will be described. The estimation unit 114 sets a section from the start time of the utterance section to a predetermined period of time (after one minute) as an initial section and acquires a standard deviation in the initial section from the spread calculation unit 112. The standard deviation in the initial section is a standard deviation calculated by the weights $\alpha$ and $\beta$ as described above after the pitch frequency is corrected.

The estimation unit 114 may calculate the standard deviation in the initial section. For example, the estimation unit 114 classifies the plurality of pitch frequencies in the initial section into a pitch frequency corresponding to the central portion and a pitch frequency corresponding to the tail portion. The estimation unit 114 corrects each pitch frequency in the central portion by multiplying each pitch frequency corresponding to the central portion by the weight "$\alpha$", respectively. The estimation unit 114 corrects each pitch frequency in the tail portion by multiplying each pitch frequency corresponding to the tail portion by the weight "$\beta$", respectively. The estimation unit 114 calculates the standard deviation of the pitch frequency, based on the respective corrected pitch frequencies in the central portion and the tail portion.

The estimation unit 114 performs the initial operation as described above and registers the speaker information and the standard deviation of the initial section in the normal time distribution table 113a in association with each other.

The update operation performed by the estimation unit 114 will be described. The estimation unit 114 acquires a standard deviation corresponding to the speaker information from the normal time distribution table 113a. The estimation unit 114 acquires a standard deviation within a predetermined section from the spread calculation unit 112. In the following description, the standard deviation acquired from the normal time distribution table 113a is referred to as a "normal time standard deviation", and the standard deviation acquired from the spread calculation unit 112 is referred to as an "evaluation standard deviation".

The estimation unit 114 calculates a new normal time standard deviation based on Equation (1), and updates the normal time standard deviation of the normal time distribution table 113a from the calculated normal time standard deviation.

$$\text{Normal time standard deviation} = 0.8 \times \text{normal time standard deviation} + 0.2 \times \text{evaluation standard deviation} \quad (1)$$

Every time the estimation unit 114 receives the standard deviation (evaluation standard deviation) within the predetermined section from the spread calculation unit 112, the estimation unit repeatedly executes the above-described process to update the normal time distribution table 113a.

The estimation unit 114 acquires the speaker information from the evaluation unit 115, and in a case where a request for the normal time standard deviation is received, the estimation unit acquires the normal time standard deviation corresponding to the speaker information from the normal time distribution table 113a, and outputs the normal time standard deviation to the evaluation unit 115.

The evaluation unit 115 is a processing unit that evaluates impression of a voice of a speaker, based on the normal time standard deviation and the evaluation standard deviation. For example, the evaluation unit 115 outputs the speaker information attached to the voice file to the estimation unit 114 and acquires the normal time standard deviation. The evaluation unit 115 acquires the evaluation standard deviation from the spread calculation unit 112.

In a case where the evaluation standard deviation is larger than the normal time standard deviation, the evaluation unit 115 evaluates that the impression is good. In a case where the evaluation standard deviation is equal to the normal time standard deviation, the evaluation unit 115 determines that the impression is normal. In a case where the evaluation standard deviation is smaller than the normal time standard deviation, the evaluation unit 115 determines that the impression is bad.

The evaluation unit 115 may perform an evaluation as will be described below. For example, in a case where the evaluation standard deviation is larger than the normal time standard deviation and a difference between the evaluation standard deviation and the normal time standard deviation is larger than or equal to a threshold, the evaluation unit 115 evaluates that the impression is good. In a case where the difference between the evaluation standard deviation and the normal time standard deviation is smaller than the threshold, the evaluation unit 115 evaluates that the impression is normal. In a case where the evaluation standard deviation is smaller than the normal time standard deviation and the difference between the evaluation standard deviation and the normal time standard deviation is larger than or equal to the threshold, the evaluation unit 115 evaluates that the impression is bad.

The evaluation unit 115 outputs the speaker information and the information of the evaluation result to the evaluation result storage unit 104.

Figure 4:
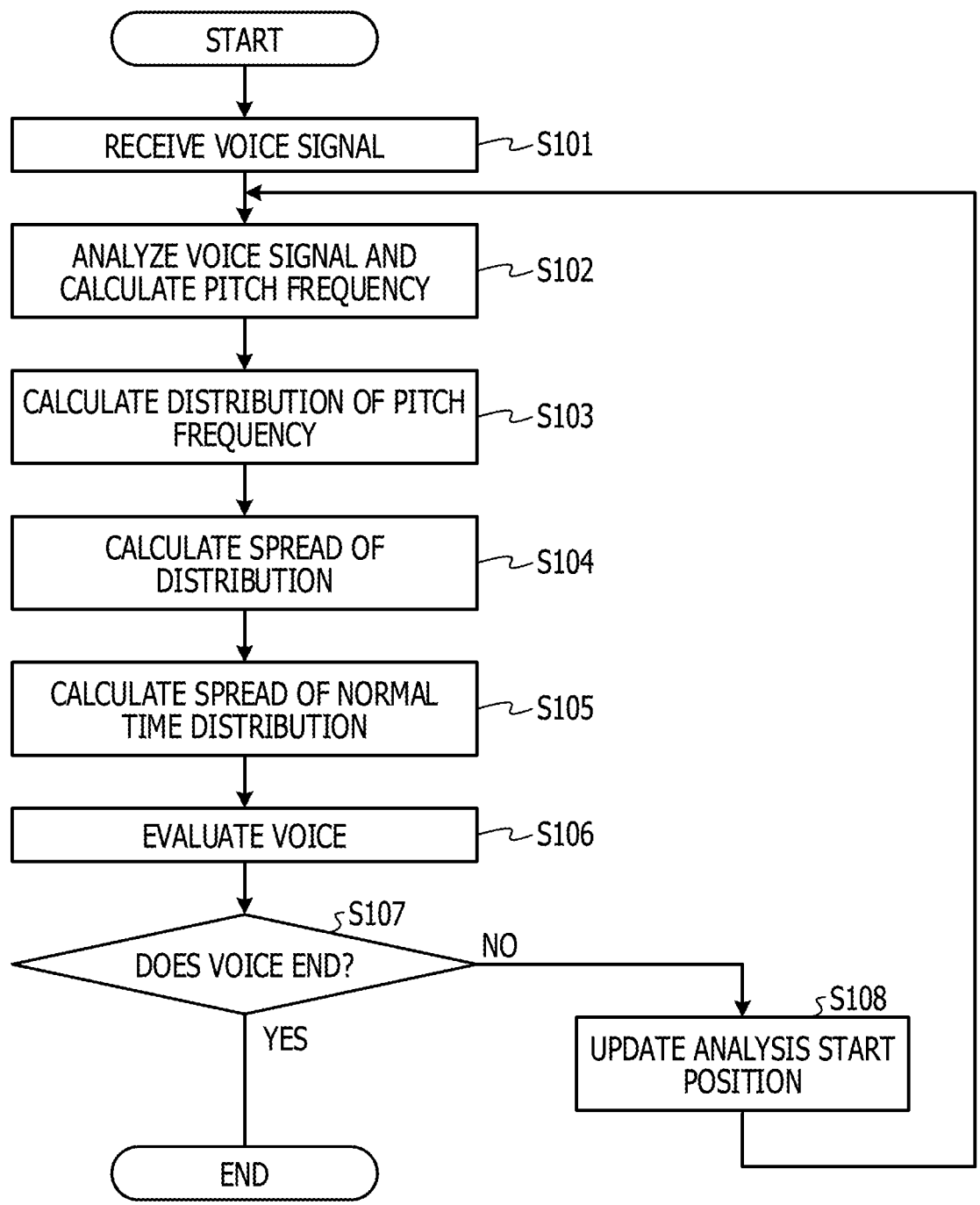
FIG. 4 is a flowchart illustrating a process sequence of the voice evaluation unit according to the first embodiment.

Next, a process sequence of the voice evaluation unit 103 of the voice evaluation apparatus 100 according to the first embodiment will be described. FIG. 4 is a flowchart illustrating a process sequence of the voice evaluation unit according to the first embodiment. As illustrated in FIG. 4, the pitch detection unit 110 of the voice evaluation unit 103 receives a voice signal (step S101).

The pitch detection unit 110 analyzes the voice signal and calculates a pitch frequency (step S102). The distribution calculation unit 111 of the voice evaluation unit 103 calculates a distribution of the pitch frequency (step S103). In step S103, the distribution calculation unit 111 makes a process of calculating the distribution of the pitch frequency correspond to a process of calculating a central portion and a tail portion of the histogram 20, based on each pitch frequency as described above.

The spread calculation unit 112 of the voice evaluation unit 103 calculates a spread of the distribution (step S104). In step S104, a process of calculating the spread of the distribution corresponds to a process of calculating the evaluation standard deviation.

The estimation unit 114 of the voice evaluation unit 103 calculates a spread of a normal time distribution (step S105). The process of calculating the spread of the normal time distribution corresponds to a process of calculating a normal time standard deviation.

The evaluation unit 115 of the voice evaluation unit 103 evaluates a voice, based on the normal time standard deviation and the evaluation standard deviation (step S106).

In a case where the voice ends (Yes in step S107), the voice evaluation unit 103 ends the process. Meanwhile, in a case where the voice does not end (No in step S107), the voice evaluation unit 103 updates an analysis start position (step S108), and proceeds to step S102.

Next, an effect of the voice evaluation apparatus 100 according to the first embodiment will be described. The voice evaluation apparatus 100 analyzes the voice signal, creates a distribution of a detection rate of the pitch frequency, performs correction to suppress the tail portion of the distribution, and evaluates the voice based on the corrected distribution. Accordingly, even in a case where a half pitch or a double pitch is calculated by the process of detecting the pitch frequency, the pitches are classified into the pitch frequencies of the tail portion, and after an influence is suppressed, the voice can be evaluated and the voice can be accurately evaluated. For example, even in a case where the half pitch or the double pitch is calculated erroneously despite being an actually bright voice, it is possible to suppress that it is evaluated to be a dark voice.

The voice evaluation apparatus 100 multiplies the pitch frequency corresponding to the central portion of the distribution (histogram) by the weight $\alpha$ and multiplies the pitch frequency corresponding to the tail portion of the distribution by the weight $\beta$ to execute a process of correcting the distribution, and thus, it is possible to suppress an error determination due to an influence of the half pitch or the double pitch.

The estimation unit 114 of the voice evaluation apparatus 100 estimates a spread of the normal time distribution of the speaker, and the evaluation unit 115 compares the spread of the normal time distribution with a spread of the current distribution to evaluate impression of the voice. Accordingly, it is possible to evaluate the voice, based on the spread of the normal time distribution of the speaker himself/herself.

In a case where the spread (standard deviation) of the normal distribution corresponding to the speaker information is stored in the normal time distribution table 113a, the estimation unit 114 of the voice evaluation apparatus 100 performs the "update operation". Thereby, it is possible to correct the normal distribution of the speaker to more appropriately.

As one example, a case where the voice evaluation apparatus 100 multiplies the pitch frequency corresponding to the central portion of the distribution (histogram) by the weight α, multiplies the pitch frequency corresponding to the tail portion of the distribution by the weight β, and thereby, the distribution is corrected is described. It can also be said that the process selects the pitch frequency of the central portion included in the distribution in that an influence of the pitch frequency of the tail portion included in the distribution is removed and evaluates the voice based on a standard deviation of the selected pitch frequency.

The pitch detection unit 110 of the voice evaluation apparatus 100 divides the voice signal in the utterance section into a plurality of sections, each having a predetermined time width and performs frequency analysis on the voice signal for each section to detect the pitch frequency for each section, but is not limited to this. For example, the pitch detection unit 110 may output an average value of the respective pitch frequencies detected from the predetermined number of sections to the distribution calculation unit 111 as the pitch frequency. The pitch detection unit 110 may output an upper limit value of the respective pitch frequencies detected from the predetermined number of sections to the distribution calculation unit 111 as the pitch frequency. The pitch detection unit 110 may output a lower limit value of the respective pitch frequencies detected from the predetermined number of sections to the distribution calculation unit 111 as the pitch frequency. Thereby, the pitch frequency can be used according to a speaker and an environment.

The spread calculation unit 112 of the voice evaluation apparatus 100 calculates a standard deviation of the respective pitch frequencies included in the utterance section as a spread of the distribution, but is not limited to this. For example, the spread calculation unit 112 may calculate any one of a variance, a range, a squared sum, and a quartile range of the respective pitch frequencies included in the utterance section as the spread of the distribution.

Figure 5:
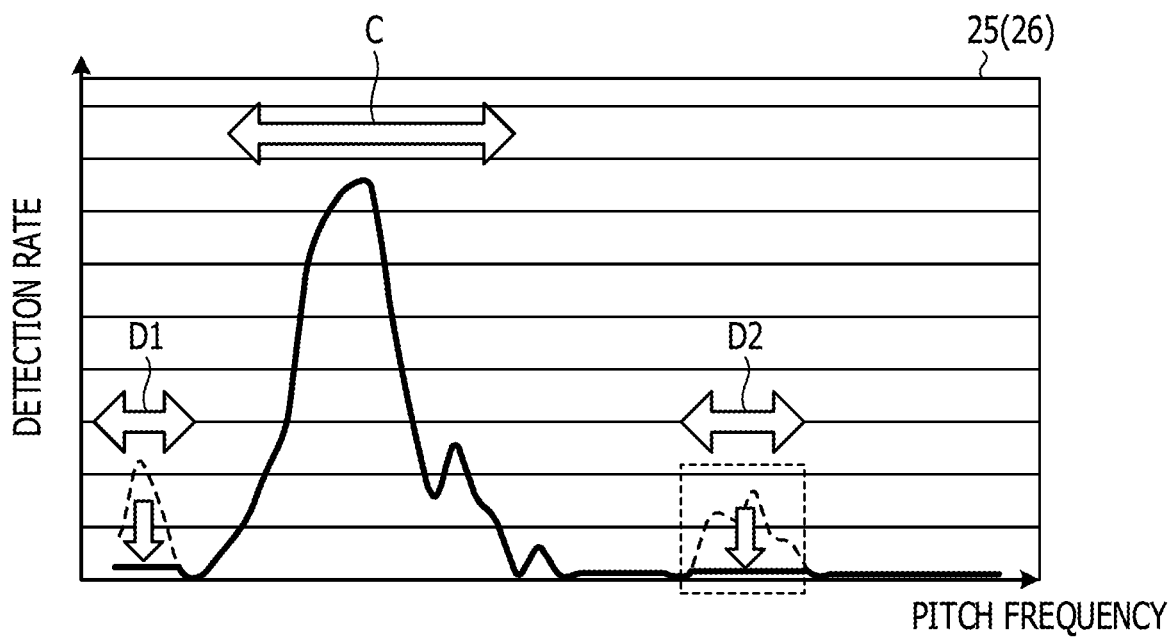
FIG. 5 is a diagram illustrating another process of the voice evaluation apparatus.

By the way, as will be described below, the voice evaluation apparatus 100 according to the first embodiment may evaluate the voice of the speaker based on an outline of the histogram of the utterance section. FIG. 5 is a diagram illustrating another process of the voice evaluation apparatus. As illustrated in FIG. 5, the voice evaluation apparatus 100 calculates a histogram 25 based on a plurality of pitch frequencies of the utterance section. A horizontal axis of the histogram 25 is an axis corresponding to the pitch frequency, and a vertical axis is an axis corresponding to the detection rate.

The voice evaluation apparatus 100 specifies a central portion C and tail portions D1 and D2 of the outline of the histogram 25 by performing pattern matching and the like. The voice evaluation apparatus 100 corrects the histogram 25 by multiplying the detection rate of the central portion C by the weight α and multiplying the detection rate of the tail portions D1 and D2 by the weight β. The corrected histogram is referred to as a histogram 26. For example, the weight α is set to "1" and the weight β is set to "0.1".

The voice evaluation apparatus 100 determines impression of a voice of a speaker, based on a magnitude of the spread of the corrected histogram 26. For example, the voice evaluation apparatus 100 specifies a range in which a detection rate of the histogram 26 is higher than or equal to a predetermined rate as the spread of the histogram 26. In a case where the spread of the histogram 26 is larger than or equal to a predetermined threshold, the voice evaluation apparatus 100 evaluates that the impression of the speaker is bright. Meanwhile, in a case where the spread of the histogram 26 is larger than or equal to the predetermined threshold, the voice evaluation apparatus 100 evaluates that the impression of the speaker is dark.

For example, since a half pitch/a double pitch exist at the tail portion of the distribution (histogram 25), by correcting the histogram 25 by reducing the weight of the tail portion and increasing the weight of the central portion, an erroneous evaluation can be suppressed.

Second Embodiment

Figure 6:
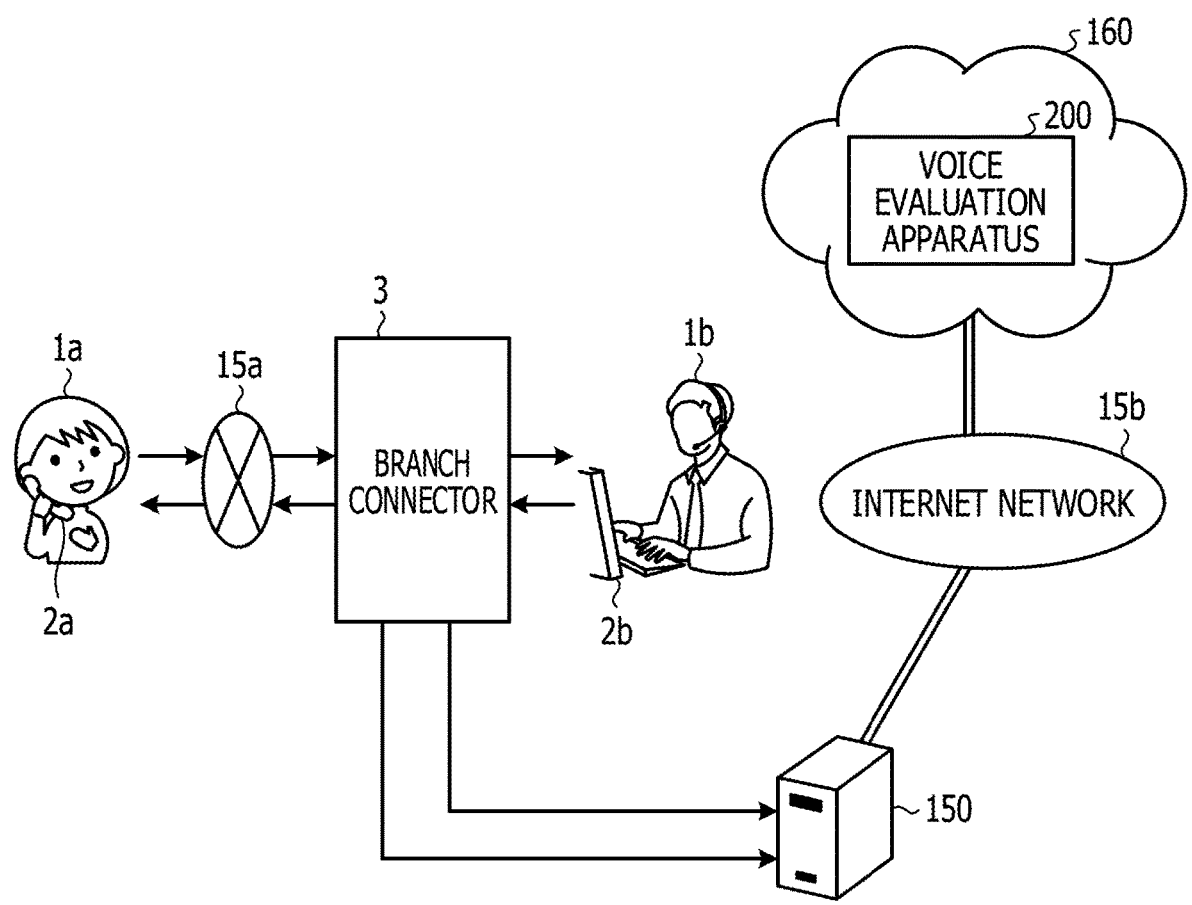
FIG. 6 is a diagram illustrating a configuration of a voice evaluation system according to a second embodiment.

FIG. 6 is a diagram illustrating a configuration of a voice evaluation system according to a second embodiment. As illustrated in FIG. 6, the voice evaluation system includes a mobile terminal 2a, a terminal apparatus 2b, a branch connector 3, a recording apparatus 150, and a cloud 160. The mobile terminal 2a is connected to the branch connector 3 via a telephone network 15a. The terminal apparatus 2b is connected to the branch connector 3. The branch connector 3 is connected to the recording apparatus 150. The recording apparatus 150 is connected to the cloud 160 via an Internet network 15b. For example, the cloud 160 includes a voice evaluation apparatus 200. While not illustrated, the voice evaluation apparatus 200 may be configured by a plurality of servers. The mobile terminal 2a and the terminal apparatus 2b are connected to a microphone (not illustrated).

Voices of a speaker 1a are collected by the microphone of the mobile terminal 2a, and a collected voice signal is transmitted to the recording apparatus 150 via the branch connector 3. In the following description, a voice signal of the speaker 1a is referred to as a "first voice signal".

The mobile terminal 2a adds attribute information of the speaker 1a to the first voice signal. For example, the attribute information includes gender information and voice height information. The gender is for identifying a gender of the speaker uniquely. The voice height or information is information indicating whether a voice of the speaker is high or low. For example, the speaker 1a registers his/her own attribute information in the mobile terminal 2a.

Voices of a speaker 1b are collected by a microphone of the terminal apparatus 2b, and a collected voice signal is transmitted to the recording apparatus 150 via the branch connector 3. In the following description, the voice signal of the speaker 1b is referred to as a "second voice signal".

The terminal apparatus 2b adds attribute information of the speaker 1b to the second voice signal. For example, the speaker 1b registers his/her own attribute information in the terminal apparatus 2b. Description on the attribute information of the speaker 1b is the same as the description on the attribute information of the speaker 1a.

The recording apparatus 150 is an apparatus that records the first voice signal and the second voice signal. For example, if the first voice signal is received, the recording apparatus 150 converts the first voice signal into a voice file by using a predetermined voice file format, and transmits the voice file of the first voice signal to the voice evaluation apparatus 200. The voice file of the first voice signal includes the attribute information of the speaker 1a. In the following description, the voice file of the first voice signal will be referred to as a "first voice file" as appropriate.

If the second voice signal is received, the recording apparatus 150 converts the second voice signal into a voice file by using a predetermined voice file format and transmits the voice file of the second voice signal to the voice evaluation apparatus 200. The voice file of the second voice signal includes the attribute information of the speaker 1b.

In the following description, the voice file of the second voice signal will be referred to as a "second voice file" as appropriate.

The voice evaluation apparatus 200 evaluates impression of the voice of the speaker 1a, based on the first voice signal of the first voice file. The voice evaluation apparatus 200 evaluates impression of the voice of the speaker 1b, based on the second voice signal of the second voice file. Then, the voice evaluation apparatus 200 calculates a score of the whole conversation between the speakers 1a and 1b, based on an evaluation result of the impression of the voice of the speaker 1a and an evaluation result of the impression of the voice of the speaker 1b.

Figure 7:
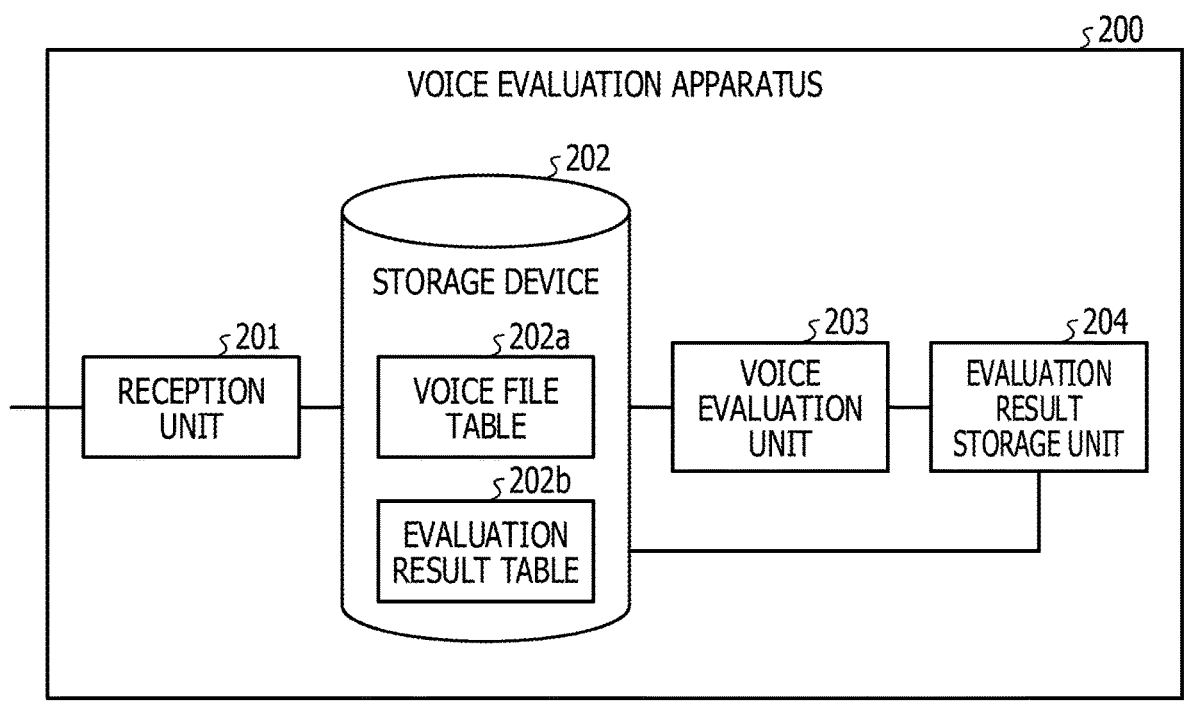
FIG. 7 is a functional block diagram illustrating a configuration of a voice evaluation apparatus according to the second embodiment.

FIG. 7 is a functional block diagram illustrating a configuration of the voice evaluation apparatus according to the second embodiment. As illustrated in FIG. 7, the voice evaluation apparatus 200 includes a reception unit 201, a storage device 202, a voice evaluation unit 203, and an evaluation result storage unit 204.

The reception unit 201 is a processing unit that receives the first voice file and the second voice file from the recording apparatus 150. The reception unit 201 registers the received first voice file and second voice file in a voice file table 202a of the storage device 202. The reception unit 201 corresponds to a communication apparatus.

The storage device 202 includes the voice file table 202a and an evaluation result table 202b. The storage device 202 corresponds to a semiconductor memory apparatus such as a RAM, a ROM or a flash memory, or a storage apparatus such as an HDD.

The voice file table 202a is a table for storing the first voice file and the second voice file.

The evaluation result table 202b is a table for storing the evaluation result. For example, the evaluation result table 202b stores the evaluation result of the speaker 1a, the evaluation result of the speaker 1b, and the score of the whole conversation between the speakers 1a and 1b.

The voice evaluation unit 203 evaluates the impressions of the voices of the speakers 1a and 1b, based on the first voice file and the second voice file. Then, the voice evaluation unit 203 calculates the score of the whole conversation between the speakers 1a and 1b, based on the evaluation results of the impressions of the voices of the speakers 1a and 1b. The voice evaluation unit 203 outputs the evaluation results of the impressions of the voices of the speakers 1a and 1b and the score of the whole conversation to the evaluation result storage unit 204.

The evaluation result storage unit 204 is a processing unit that stores the evaluation results of the impressions of the voices of the speakers 1a and 1b and the score of the whole conversation in the evaluation result table 202b.

The voice evaluation unit 203 and the evaluation result storage unit 204 illustrated in FIG. 7 correspond to a predetermined control unit (not illustrated). For example, the control unit can be realized by a CPU, an MPU or the like. The control unit can be realized by hard-wired logic such as an ASIC and a FPGA.

Figure 8:
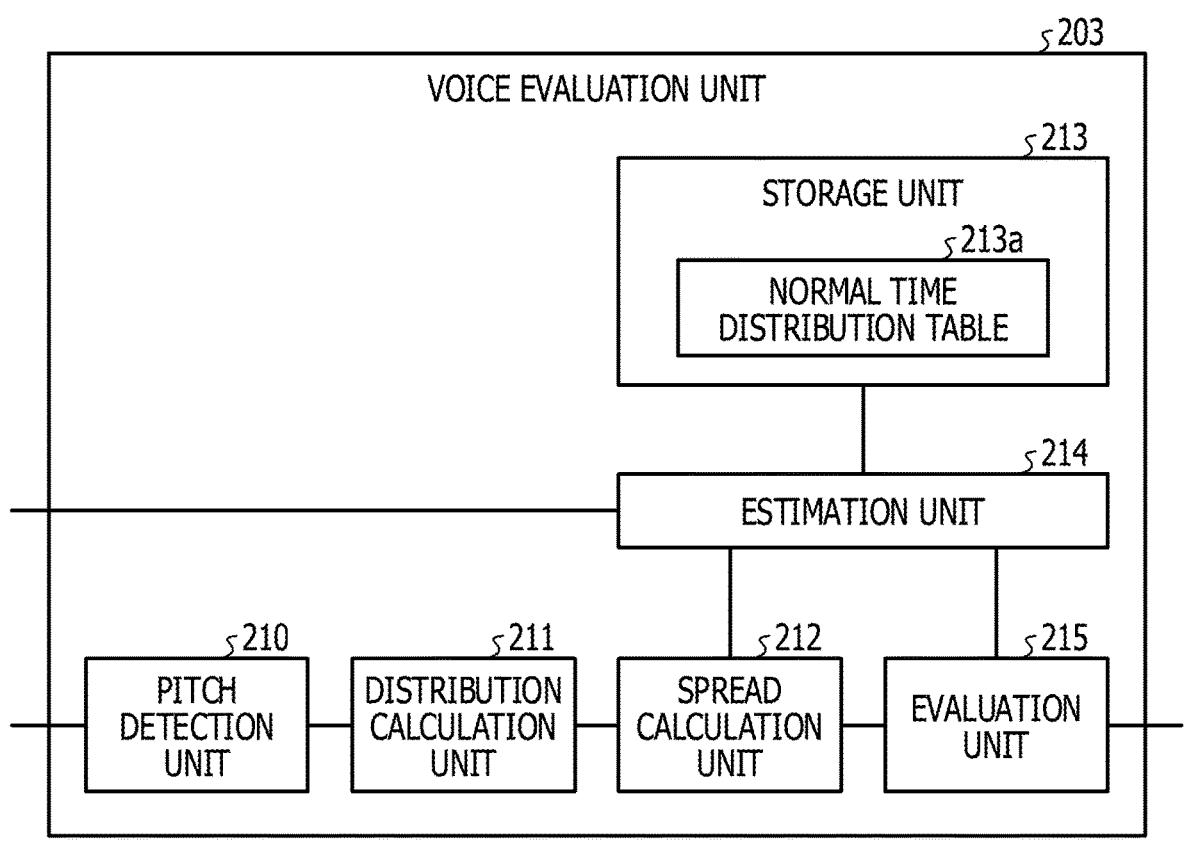
FIG. 8 is a functional block diagram illustrating a configuration of a voice evaluation unit according to the second embodiment.

Subsequently, a configuration of the voice evaluation unit 203 illustrated in FIG. 7 will be described. FIG. 8 is a functional block diagram illustrating the configuration of the voice evaluation unit according to the second embodiment. As illustrated in FIG. 8, the voice evaluation unit 203 includes a pitch detection unit 210, a distribution calculation unit 211, a spread calculation unit 212, a storage unit 213, an estimation unit 214, and an evaluation unit 215.

The pitch detection unit 210 is a processing unit that detects a pitch frequency for each predetermined section by performing a frequency analysis on the voice signal of the voice file. For example, the pitch detection unit 210 detects the first pitch frequency of the first voice signal by performing a frequency analysis of a first voice signal of the first voice file. The pitch detection unit 210 detects a second pitch frequency of the second voice signal by performing a frequency analysis on a second voice signal of the second voice file. The process in which the pitch detection unit 210 detects the pitch frequency from the voice signal is the same as the process in which the pitch detection unit 110 illustrated in FIG. 2 detects the pitch frequency from the voice signal.

The pitch detection unit 210 outputs attribute information of the speaker 1a and a plurality of first pitch frequencies to the distribution calculation unit 211. The pitch detection unit 210 outputs attribute information of the speaker 1b and a plurality of second pitch frequencies to the distribution calculation unit 211.

The distribution calculation unit 211 is a processing unit that calculates a histogram, based on a plurality of pitch frequencies within a predetermined section. For example, the distribution calculation unit 211 calculates a first histogram, based on the plurality of first pitch frequencies within the predetermined section. The distribution calculation unit 211 calculates a second histogram, based on the plurality of second pitch frequencies within the predetermined section. The process in which the distribution calculation unit 211 calculates the histogram is the same as the process in which the distribution calculation unit 111 illustrated in FIG. 2 calculates the histogram.

The distribution calculation unit 211 outputs information of the first histogram calculated based on the plurality of first pitch frequencies to the spread calculation unit 212. The information of the first histogram includes the information of the central portion of the first histogram and the information of the tail portion of the first histogram.

The distribution calculation unit 211 outputs information of the second histogram calculated based on the plurality of second pitch frequencies to the spread calculation unit 212. The information of the second histogram includes the information of the central portion of the second histogram and the information of the tail portion of the second histogram.

The spread calculation unit 212 is a processing unit that calculates a spread of the histogram after the histogram is corrected. For example, the spread calculation unit 212 corrects the first histogram and then calculates a spread of the first histogram. The spread calculation unit 212 corrects the second histogram and then calculates a spread of the second histogram. The process in which the spread calculation unit 212 calculates the spread of the histogram is the same as the process in which the spread calculation unit 112 illustrated in FIG. 2 calculates the spread of the histogram. For example, the spread of the corrected histogram corresponds to the standard deviation based on the corrected pitch frequency (first pitch frequency and second pitch frequency).

The spread calculation unit 212 outputs information on the standard deviation corresponding to the spread of the corrected histogram to the estimation unit 214 and the evaluation unit 215 in association with the attribute information. For example, the spread calculation unit 212 outputs information on the standard deviation corresponding to the spread of the corrected first histogram to the estimation unit 214 and the evaluation unit 215 in association with the attribute information of the speaker 1a. The spread calculation unit 212 outputs information on the standard deviation corresponding to the spread of the corrected second histogram to the estimation unit 214 and the evaluation unit 215 in association with the attribute information of the speaker 1b.

The storage unit 213 includes a normal time distribution table 213a. The storage unit 213 corresponds to a semiconductor memory apparatus such as a RAM, a ROM or a flash memory, or a storage apparatus such as an HDD.

The normal time distribution table 213a is a table for holding information of the spread of the histogram in a normal time of the speaker corresponding to the attribute information. For example, the normal time distribution table 213a associates the attribute information with the standard deviation. The standard deviation of the normal time distribution table 213a is estimated by the estimation unit 214 which will be described below.

FIG. 9 is a diagram illustrating an example of a data structure of the normal time distribution table according to the second embodiment. As illustrated in FIG. 9, the normal time distribution table 213a associates the attribute information with the standard deviation. The attribute information associates the gender information with the voice height information.

The estimation unit 214 is a processing unit that estimates a standard deviation of the speakers in a normal time for each piece of attribute information. The estimation unit 214 stores the attribute information and the standard deviation in the normal time in the normal time distribution table 213a in association with each other. The estimation unit 214 acquires the attribute information attached to the voice file (the first voice file and the second voice file).

The estimation unit 214 acquires the attribute information, and performs the "initial operation" in a case where the standard deviation corresponding to the attribute information is not stored in the normal time distribution table 213a. Meanwhile, in a case where the standard deviation corresponding to the attribute information is stored in the normal time distribution table 213a, the estimation unit 214 performs the "update operation". Description on the initial operation and the update operation performed by the estimation unit 214 is the same as the description on the initial operation and the update operation of the estimation unit 114 except for being performed for each attribute information.

In the following description, a standard deviation which corresponds to the attribute information of the speaker 1a and is acquired from the normal time distribution table 213a is referred to as a "first normal time standard deviation". A standard deviation which corresponds to the attribute information of the speaker 1a and is obtained from the spread calculation unit 212 is referred to as a "first evaluation standard deviation".

A standard deviation which corresponds the attribute information of the speaker 1b and is acquired from the normal time distribution table 213a is referred to as a "second normal time standard deviation". A standard deviation which corresponds to the attribute information of the speaker 1b and is acquired from the spread calculation unit 212 is referred to as a "second evaluation standard deviation".

In a case where the estimation unit 214 acquires the attribute information of the speaker 1a and receives a request for the first normal time standard deviation from the evaluation unit 215, the estimation unit acquires the first normal time standard deviation from the normal time distribution table 213a and outputs the first normal time standard deviation to the evaluation unit 215.

In a case where the estimation unit 214 acquires the attribute information of the speaker 1b and receives a request for the second normal time standard deviation from the evaluation unit 215, the estimation unit acquires the second normal time standard deviation from the normal time distribution table 213a and outputs the second normal time standard deviation to the evaluation unit 215.

The evaluation unit 215 is a processing unit that evaluates impressions of voices of the speakers 1a and 1b, based on each standard deviation. The evaluation unit 215 calculates a score of the whole conversation between the speakers 1a and 1b, based on the evaluation result of the impressions of the voices of the speakers 1a and 1b.

For example, the evaluation unit 215 evaluates the impression of the voice of the speaker 1a, based on the first normal time standard deviation and the first evaluation standard deviation. The evaluation unit 215 evaluates the impression of the voice of the speaker 1b, based on the second normal time standard deviation and the second evaluation standard deviation. The process in which the evaluation unit 215 evaluates the impressions of the voices of the speakers 1a and 1b, based on each standard deviation is the same as the process in which the evaluation unit 115 evaluates the voice.

By repeating the above process, the evaluation unit 215 specifies an evaluation result of the speaker 1a and an evaluation result of the speaker 1b for each predetermined section.

Subsequently, the evaluation unit 215 specifies the evaluation result of the speaker 1a and the evaluation result of the speaker 1b, and then calculates the score of the whole conversation, based on Equation (2).

Score of whole conversation=(number of sections evaluated that impression of speaker 1a is good+number of sections evaluated that impression of speaker 1b is good)/(total number of sections×2)×100     (2)

The evaluation unit 215 outputs the evaluation result of the impressions of the voices of the speakers 1a and 1b and the score of the whole conversation to the evaluation result storage unit 204.

Next, an effect of the voice evaluation apparatus 200 according to the second embodiment will be described. The voice evaluation apparatus 200 learns a normal time standard deviation in accordance with attribute information of a speaker and evaluates a voice of the speaker by using the normal time standard deviation corresponding to the attribute information of the speaker at the time of evaluation. Accordingly, it is possible to evaluate the voice based on the attribute information of the speaker and to improve an evaluation accuracy.

Since the voice evaluation apparatus 200 calculates a score of a whole conversation based on the evaluation result of voices of respective speakers 1a and 1b, an administrator or the like can grasp goodness or badness of the whole conversation with reference to the score. For example, it can be said that as the score of the whole conversation calculated by Equation (2) is increased, content of the conversation is good.

Third Embodiment

Figure 10:
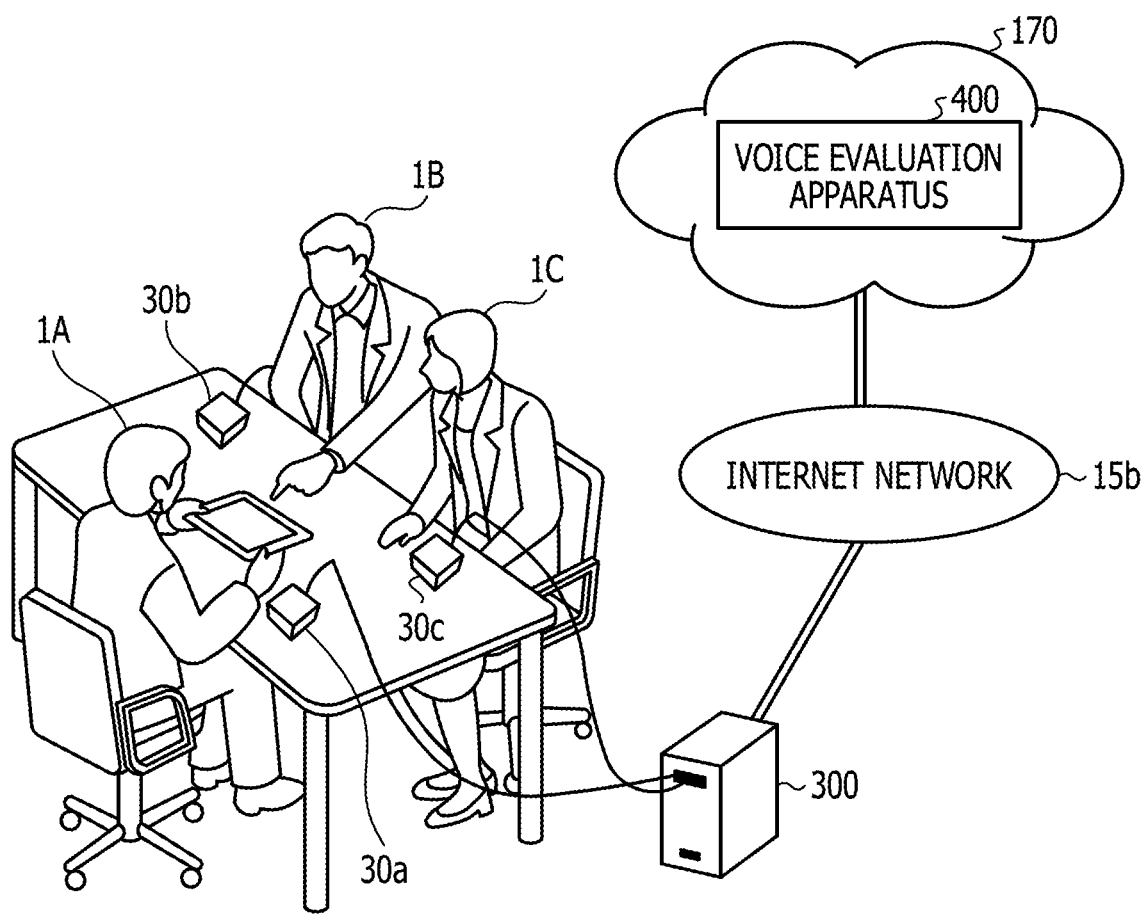
FIG. 10 is a diagram illustrating a configuration of a voice evaluation system according to a third embodiment.

FIG. 10 is a diagram illustrating a configuration of a voice evaluation system according to a present third embodiment. As illustrated in FIG. 10, the voice evaluation system includes microphones 30a, 30b, and 30c, a recording apparatus 300, and a cloud 170. The microphones 30a to 30c are connected to the recording apparatus 300. The recording apparatus 300 is connected to the cloud 170 via an Internet network 15b. For example, the cloud 170 includes a voice evaluation apparatus 400. While not illustrated, the voice evaluation apparatus 400 may be configured by a plurality of servers.

Voices of the speaker 1A is collected by the microphone 30a, and a collected voice signal is output to the recording apparatus 300. Voices of the speaker 1B are collected by the microphone 30b, and a collected voice signal is output to the recording apparatus 300. Voices of the speaker 1C are collected by the microphone 30c, and a collected voice signal is output to the recording apparatus 300.

In the following description, the voice signal of the speaker 1A is referred to as a "first voice signal". The voice signal of the speaker 1B is referred to as a "second voice signal". The voice signal of the speaker 1C is referred to as a "third voice signal".

Speaker information of the speaker 1A is given to the first voice signal. The speaker information is information for uniquely identifying the speaker. Speaker information of the speaker 1B is given to the second voice signal. Speaker information of the speaker 1C is given to the third voice signal.

The recording apparatus 300 is an apparatus that records the first voice signal, the second voice signal, and the third voice signal. The recording apparatus 300 executes a process of detecting a pitch frequency of each voice signal. The recording apparatus 300 transmits the speaker information and the pitch frequency for each predetermined section to the voice evaluation apparatus 400 in association with each other.

The voice evaluation apparatus 400 is a processing unit that evaluates the voice of each speaker, based on the pitch frequency of each speaker information received from the recording apparatus 300. The voice evaluation apparatus 400 also evaluates impressions of conversations of the speakers 1A to 1C, based on evaluation results of the voices of the respective speakers.

Figure 11:
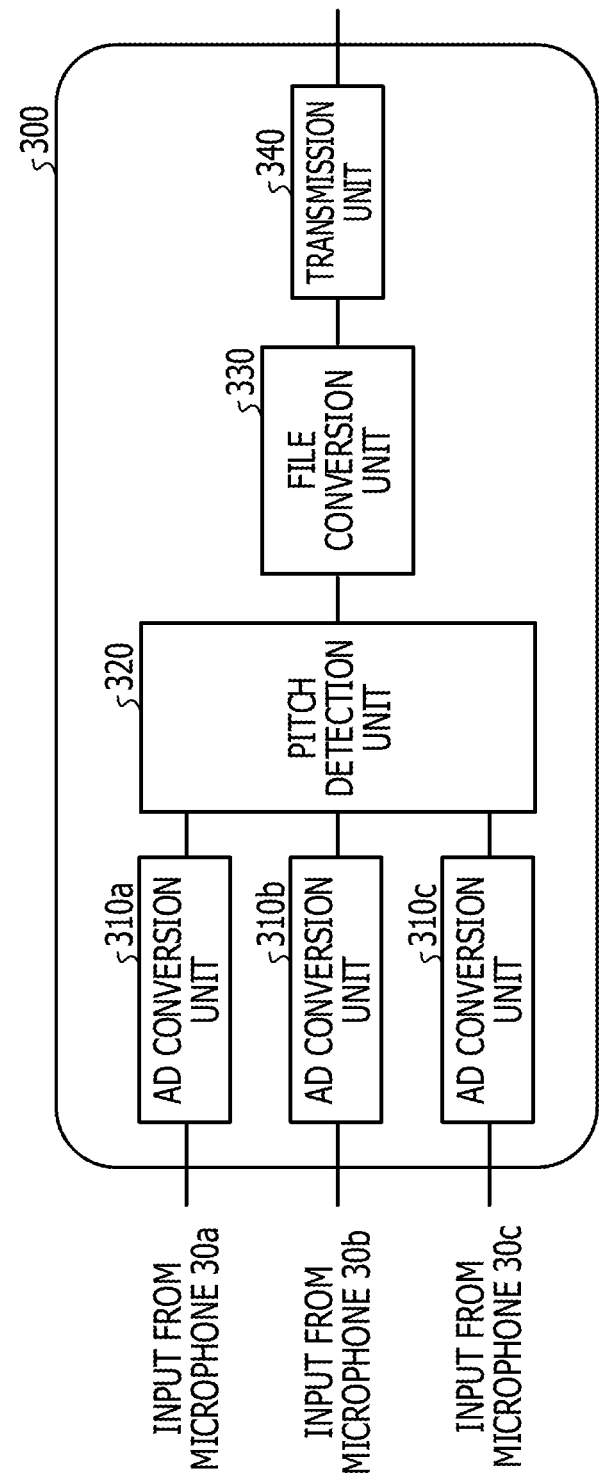
FIG. 11 is a functional block diagram illustrating a configuration of a recording apparatus according to the third embodiment.

FIG. 11 is a functional block diagram illustrating a configuration of the recording apparatus according to the third embodiment. As illustrated in FIG. 11, the recording apparatus 300 includes AD conversion units 310a to 310c, a pitch detection unit 320, a file conversion unit 330, and a transmission unit 340.

The AD conversion unit 310a is a processing unit that receives the first voice signal from the microphone 30a and performs an AD conversion. For example, the AD conversion unit 310a converts the first voice signal (analog signal) into the first voice signal (digital signal). The AD conversion unit 310a outputs the first voice signal (digital signal) to the pitch detection unit 320. In the following description, the first voice signal (digital signal) output from the AD conversion unit 310a is simply referred to as the first voice signal.

The AD conversion unit 310b is a processing unit that receives the second voice signal from the microphone 30b and performs an AD conversion. For example, the AD conversion unit 310b converts the second voice signal (analog signal) into the second voice signal (digital signal). The AD conversion unit 310b outputs the second voice signal (digital signal) to the pitch detection unit 320. In the following description, the second voice signal (digital signal) output from the AD conversion unit 310b is simply referred to as a second voice signal.

The AD conversion unit 310c is a processing unit that receives the third voice signal from the microphone 30c and performs an AD conversion. For example, the AD conversion unit 310c converts the third voice signal (analog signal) into the third voice signal (digital signal). The AD conversion unit 310c outputs the third voice signal (digital signal) to the pitch detection unit 320. In the following description, the third voice signal (digital signal) output from the AD conversion unit 310c is simply referred to as a third voice signal.

The pitch detection unit 320 is a processing unit that calculates a pitch frequency for each predetermined section by performing a frequency analysis of the voice signal. For example, the pitch detection unit 320 detects a first pitch frequency of the first voice signal by performing a frequency analysis of the first voice signal. The pitch detection unit 320 detects a second pitch frequency of the second voice signal by performing a frequency analysis of the second voice signal. The pitch detection unit 320 detects a third pitch frequency of the third voice signal by performing a frequency analysis of the third voice signal.

The pitch detection unit 320 outputs the speaker information of the speaker 1A and the first pitch frequency for each predetermined section to the file conversion unit 330 in association with each other. The pitch detection unit 320 outputs the speaker information of the speaker 1B and the second pitch frequency for each predetermined section to the file conversion unit 330 in association with each other. The pitch detection unit 320 outputs the speaker information of the speaker 1C and the third pitch frequency for each predetermined section to the file conversion unit 330 in association with each other.

The file conversion unit 330 is a processing unit that generates "voice file information" by converting the information received from the pitch detection unit 320 into a file. The voice file information includes information in which the speaker information and the pitch frequency for each predetermined section are associated with each other. For example, the voice file information includes information in which the speaker information of the speaker 1A and the first pitch frequency for each predetermined section are associated with each other. The voice file information includes information in which the speaker information of the speaker 1B and the second pitch frequency for each predetermined section are associated with each other. The voice file information includes information in which the speaker information of the speaker 1C and the third pitch frequency for each predetermined section are associated with each other. The file conversion unit 330 outputs the voice file information to the transmission unit 340.

The transmission unit 340 acquires voice file information from the file conversion unit 330, and transmits the acquired voice file information to the voice evaluation apparatus 400.

Figure 12:
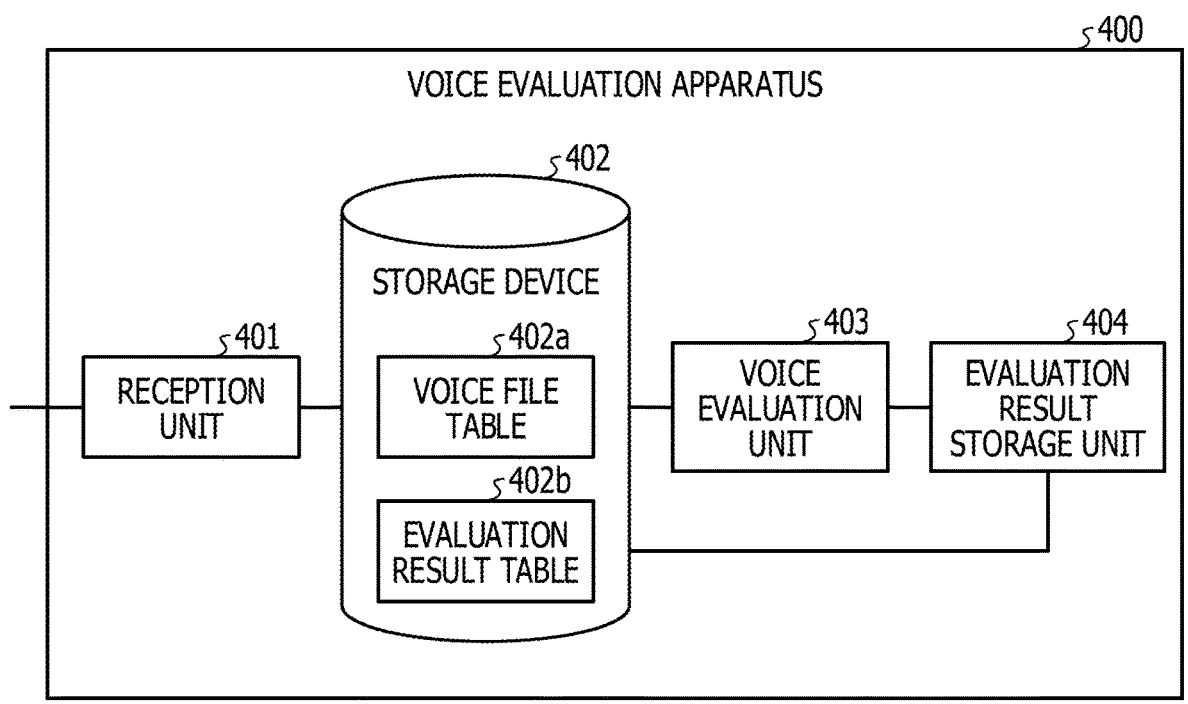
FIG. 12 is a functional block diagram illustrating a configuration of a voice evaluation apparatus according to the third embodiment.

FIG. 12 is a functional block diagram illustrating a configuration of the voice evaluation apparatus according to the third embodiment. As illustrated in FIG. 12, the voice evaluation apparatus 400 includes a reception unit 401, a storage device 402, a voice evaluation unit 403, and an evaluation result storage unit 404.

The reception unit 401 is a processing unit that receives the voice file information from the recording apparatus 300. The reception unit 401 registers the received voice file information in a voice file table 402a of the storage device 402. The reception unit 401 corresponds to a communication apparatus.

The storage device 402 includes the voice file table 402a and an evaluation result table 402b. The storage device 402 corresponds to a semiconductor memory apparatus such as a RAM, a ROM or a flash memory, or a storage apparatus such as an HDD.

The voice file table 402a is a table for storing the voice file information. The voice file information includes information in which the speaker information of the speaker 1A and the first pitch frequency for each predetermined section are associated with each other. The voice file information includes information in which the speaker information of the speaker 1B and the second pitch frequency for each predetermined section are associated with each other. The voice file information includes information in which the speaker information of the speaker 1C and the third pitch frequency for each predetermined section are associated with each other.

The evaluation result table 402b is a table for storing the evaluation results. For example, the evaluation result table 402b stores the evaluation results of the speakers 1A to 1C and the evaluation results of the whole conversation between the speakers 1A to 1C.

The voice evaluation unit 403 evaluates impressions of the voices of the speakers 1A to 1C, based on the voice file information. The voice evaluation unit 403 evaluates the whole conversation between the speakers 1A to 1C, based on the evaluation results of the impressions of the voices of the speakers 1A to 1C. The voice evaluation unit 403 outputs the evaluation results of the impressions of the voices of the speakers 1A to 1C and the evaluation results of the whole conversation to the evaluation result storage unit 404.

The evaluation result storage unit 404 is a processing unit that stores the evaluation results of the impressions of the voices of the speakers 1A to 1C and the evaluation results of the whole conversation in the evaluation result table 402b.

The voice evaluation unit 403 and the evaluation result storage unit 404 illustrated in FIG. 12 correspond to a predetermined control unit (not illustrated). For example, the control unit can be realized by a CPU, an MPU or the like. The control unit can be realized by a hard-wired logic such as an ASIC and an FPGA.

Figure 13:
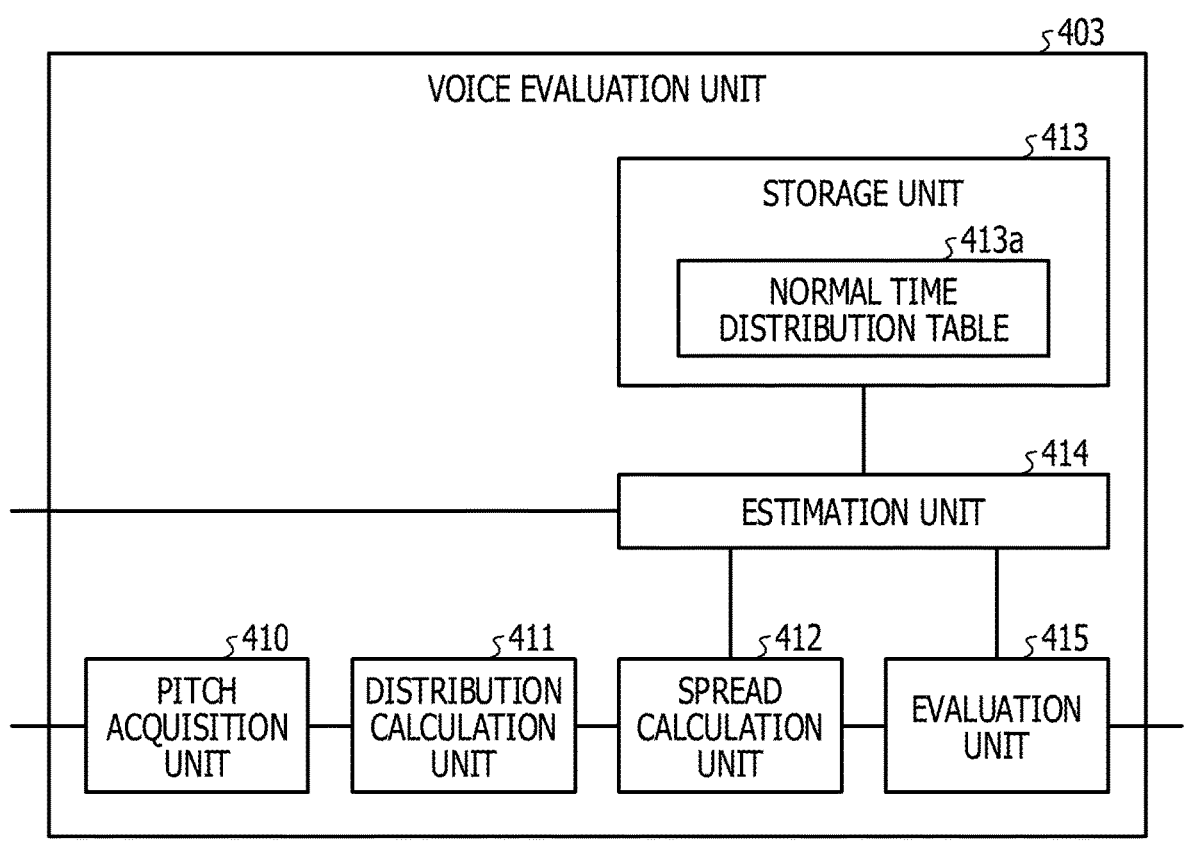
FIG. 13 is a functional block diagram illustrating a configuration of a voice evaluation unit according to the third embodiment.

Subsequently, a configuration of the voice evaluation unit 403 illustrated in FIG. 13 will be described. FIG. 13 is a functional block diagram illustrating the configuration of the voice evaluation unit according to the third embodiment. As illustrated in FIG. 13, the voice evaluation unit 403 includes a pitch acquisition unit 410, a distribution calculation unit 411, a spread calculation unit 412, a storage unit 413, an estimation unit 414, and an evaluation unit 415.

The pitch acquisition unit 410 is a processing unit that acquires the voice file information from the voice file table 402a. The pitch acquisition unit 410 outputs the voice file information to the distribution calculation unit 411.

The distribution calculation unit 411 is a processing unit that calculates a histogram, based on a plurality of pitch frequencies within a predetermined section. For example, the distribution calculation unit 411 calculates a first histogram, based on a plurality of first pitch frequencies within the predetermined section. The distribution calculation unit 411 calculates a second histogram, based on a plurality of second pitch frequencies within the predetermined section. The distribution calculation unit 411 calculates a third histogram, based on a plurality of third pitch frequencies within the predetermined section. The process in which the distribution calculation unit 411 calculates the histogram is the same as the process in which the distribution calculation unit 111 illustrated in FIG. 2 calculates the histogram.

The distribution calculation unit 411 outputs information of the first histogram calculated based on the plurality of first pitch frequencies to the spread calculation unit 412. The information of the first histogram includes information of a central portion of the first histogram and information of a tail portion of the first histogram.

The distribution calculation unit 411 outputs information of the second histogram calculated based on the plurality of second pitch frequencies to the spread calculation unit 412. The information of the second histogram includes information of a central portion of the second histogram and information of a tail portion of the second histogram.

The distribution calculation unit 411 outputs information of the third histogram calculated based on the plurality of third pitch frequencies to the spread calculation unit 412. The information of the third histogram includes information of a central portion of the third histogram and information of a tail portion of the third histogram.

The spread calculation unit 412 is a processing unit that calculates a spread of the histogram after correcting the histogram. For example, the spread calculation unit 412 corrects the first histogram and then calculates the spread of the first histogram. The spread calculation unit 412 corrects the second histogram and then calculates the spread of the second histogram. The spread calculation unit 412 corrects the third histogram and then calculates the spread of the third histogram. The process in which the spread calculation unit 412 calculates the spread of the histogram is the same as the process in which the spread calculation unit 112 illustrated in FIG. 2 calculates the spread of the histogram. For example, the spread of the corrected histogram corresponds to the standard deviation based on the corrected pitch frequencies (the first pitch frequency, the second pitch frequency, and third pitch frequency).

The spread calculation unit 412 outputs information of the standard deviation corresponding to the spread of the corrected histogram to the estimation unit 414 and the evaluation unit 415 in association with the speaker information. For example, the spread calculation unit 412 outputs the information of the standard deviation corresponding to the spread of the corrected first histogram to the estimation unit 414 and the evaluation unit 415 in association with the speaker information of the speaker 1A. The spread calculation unit 412 outputs the information of the standard deviation corresponding to the spread of the corrected second histogram to the estimation unit 414 and the evaluation unit 415 in association with the speaker information of the speaker 1B. The spread calculation unit 412 outputs the information of the standard deviation corresponding to the spread of the corrected second histogram to the estimation unit 414 and the evaluation unit 415 in association with the speaker information of the speaker 1C.

The storage unit 413 includes a normal time distribution table 413a. The storage unit 413 corresponds to a semiconductor memory apparatus such as a RAM, a ROM or a flash memory, or a storage apparatus such as an HDD.

The normal time distribution table 413a is a table for holding the information of the spread of the histogram in a normal time of the speaker corresponding to the speaker information. For example, the normal time distribution table 413a associates the speaker information with the standard deviation. The standard deviation of the normal time distribution table 413a is estimated by the estimation unit 414 which will be described below.

The estimation unit 414 is a processing unit that estimates the standard deviation of the speakers in a normal time for each speaker information. The estimation unit 414 stores the speaker information and the standard deviation in the normal time in the normal time distribution table 413a in association with each other. The estimation unit 414 acquires speaker information attached to the voice file information.

The estimation unit 414 acquires the speaker information and performs an "initial operation" in a case where the standard deviation corresponding to the speaker information is not stored in the normal time distribution table 413a. Meanwhile, in a case where the standard deviation corresponding to the speaker information is stored in the normal time distribution table 413a, the estimation unit 414 performs an "update operation". Description on the initial operation and the update operation performed by the estimation unit 414 is the same as the description on the initial operation and the update operation of the estimation unit 114 illustrated in FIG. 2.

In the following description, the standard deviation which corresponds to the speaker information of the speaker 1A and is acquired from the normal time distribution table 413a is referred to as a "first normal time standard deviation". The standard deviation which corresponds to the speaker information of the speaker 1A and is obtained from the spread calculation unit 412 is referred to as a "first evaluation standard deviation".

The standard deviation which corresponds to the speaker information of the speaker 1B and is acquired from the normal time distribution table 413a is referred to as a "second normal time standard deviation". The standard deviation which corresponds to speaker information of the speaker 1B and is acquired from the spread calculation unit 412 is referred to as a "second evaluation standard deviation".

The standard deviation which corresponds to speaker information of the speaker 1C and is acquired from the normal time distribution table 413a is referred to as a "third normal time standard deviation". The standard deviation which corresponds to the speaker information of the speaker 1C and is obtained from the spread calculation unit 412 is referred to as a "third evaluation standard deviation".

The estimation unit 414 acquires the speaker information of the speaker 1A from the evaluation unit 415, updates the first normal time standard deviation from the normal time distribution table 413a in a case where a request for the first normal time standard deviation is received, and outputs the first normal time standard deviation to the evaluation unit 415.

The estimation unit 414 acquires the speaker information of the speaker 1B from the evaluation unit 415, acquires the second normal time standard deviation from the normal time distribution table 413a in a case where a request for the second normal time standard deviation is received, and outputs the second normal time standard deviation to the evaluation unit 415.

The estimation unit 414 acquires the speaker information of the speaker 1C from the evaluation unit 415, acquires the third normal time standard deviation from the normal time distribution table 413a in a case where a request for the third normal time standard deviation is received, and outputs the third normal time standard deviation to the evaluation unit 415.

The evaluation unit 415 is a processing unit that evaluates impressions of voices of the speakers 1A to 1C, based on the respective standard deviations. The evaluation unit 415 evaluates the whole conversation of the speakers 1A to 1C, based on the evaluation results of the impressions of the voices of the speakers 1A to 1C.

For example, the evaluation unit 415 evaluates the impression of the voice of the speaker 1A, based on the first normal time standard deviation and the first evaluation standard deviation. The evaluation unit 415 evaluates the impression of the voice of the speaker 1B, based on the second normal time standard deviation and the second evaluation standard deviation. The evaluation unit 415 evaluates the impression of the voice of the speaker 1C, based on the third normal time standard deviation and the third evaluation standard deviation. The process in which the evaluation unit 415 evaluates the impressions of the voices of the speakers 1A to 1C based on the respective standard deviations is the same as the process in which the evaluation unit 115 evaluates the voices.

By repeating the above process, the evaluation unit 415 specifies the evaluation result of the speaker 1A, the evaluation result of the speaker 1B, and the evaluation result of the speaker 1C for each predetermined section.

Subsequently, the evaluation unit 415 evaluates the whole conversation after specifying the evaluation results of the speakers 1A to 1C. For example, the evaluation unit 415 specifies an average evaluation result among the respective evaluation results "good, normal, bad" between predetermined frames for each speaker. For example, the evaluation unit 415 sets the most frequent evaluation result among the respective evaluation results between the predetermined frames as the average evaluation result.

In a case where the average evaluation results of the respective speakers 1A to 1C are very close to each other, the evaluation unit 415 determines to be a good conversation. In a case where the average evaluation results of the respective speakers 1A to 1C are different from each other, the evaluation unit 415 determines to be a bad conversation.

For example, the evaluation unit 415 compares the average evaluation results of the respective speakers 1A to 1C with each other, and determines to be a good conversation in a case where two or more average evaluation result match each other. Meanwhile, the evaluation unit 415 compares the average evaluation results of the respective speakers 1A to 1C, and determines to be a bad conversation in a case where two or more average evaluation results do not match each other.

The evaluation unit 415 outputs the evaluation results of the impressions of the voices of the speakers 1A to 1C and the evaluation results of the whole conversation to the evaluation result storage unit 404.

Next, an effect of the voice evaluation apparatus 400 according to the third embodiment will be described. The voice evaluation apparatus 400 learns a normal time standard deviation in accordance with speaker information of a speaker and evaluates a voice of a speaker by using the normal time standard deviation corresponding to the speaker information of the speaker at the time of evaluation. Accordingly, it is possible to evaluate the voice based on the speaker information, and to improve an evaluation accuracy.

Since the voice evaluation apparatus 400 evaluates the whole conversation based on the evaluation results of the voices of the speakers 1A to 1C, an administrator or the like can grasp goodness or badness of the whole conversation.

In a case where the whole conversation is evaluated, the voice evaluation apparatus 400 according to the third embodiment may calculate a score of the whole conversation based on Equation (3).

Score of whole conversation=(number of sections evaluated that impression of speaker 1A is good+number of sections evaluated that impression of speaker 1B is good+number of sections evaluated that impression of speaker 1C is good)/(Total number of sections 3)×100  (3)

Figure 14:
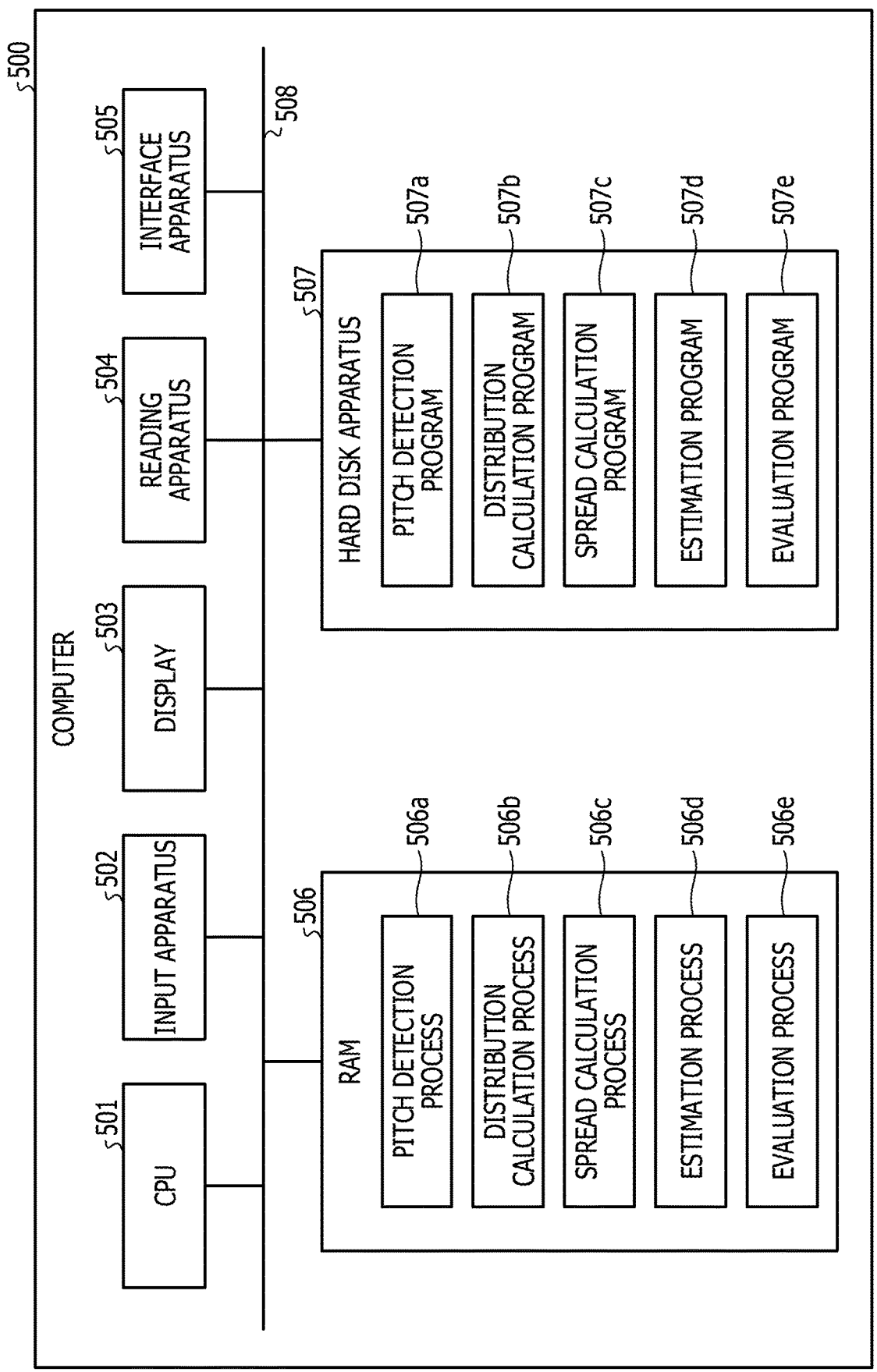
FIG. 14 is a diagram illustrating an example of a hardware configuration of a computer that realizes the same functions as the voice evaluation apparatus.
Figure 15:
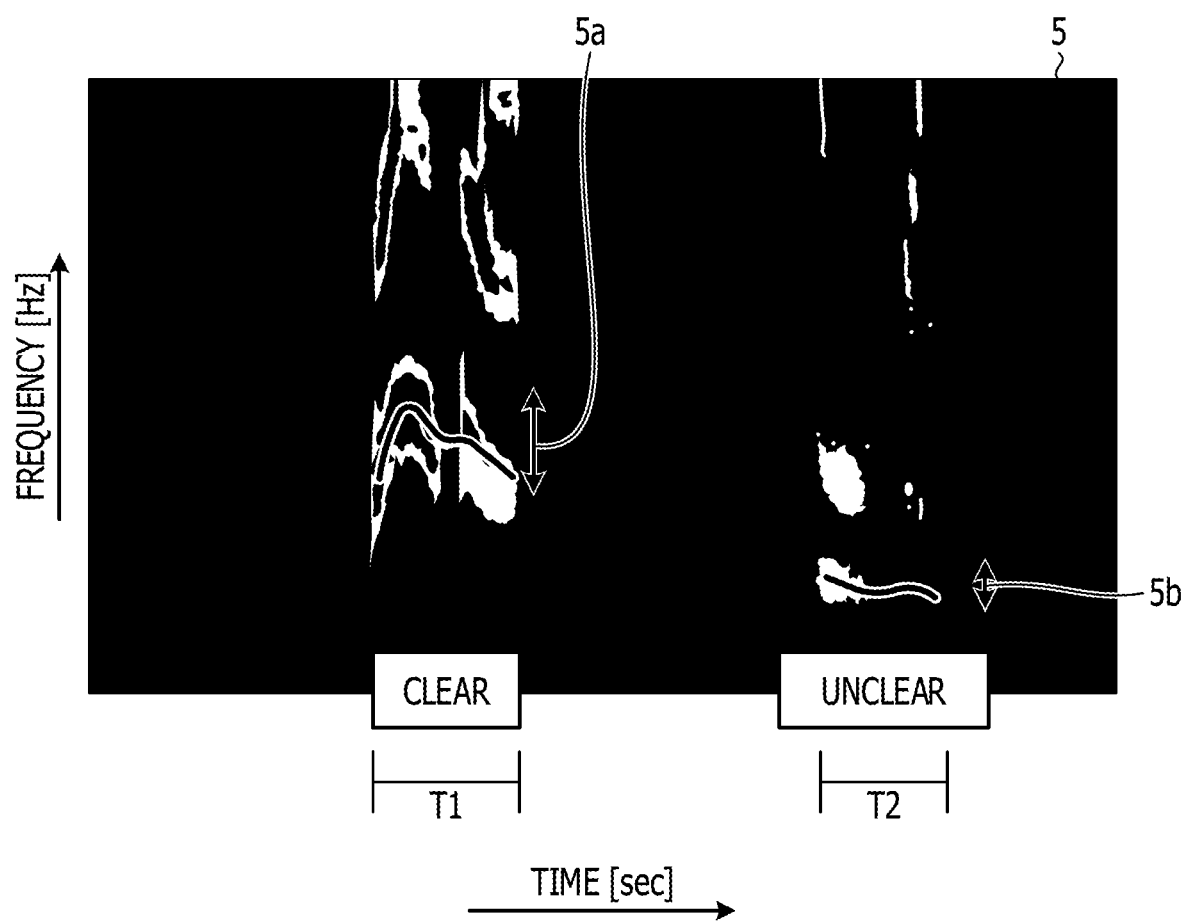
FIG. 15 is a diagram illustrating a technique of related art.
Figure 16:
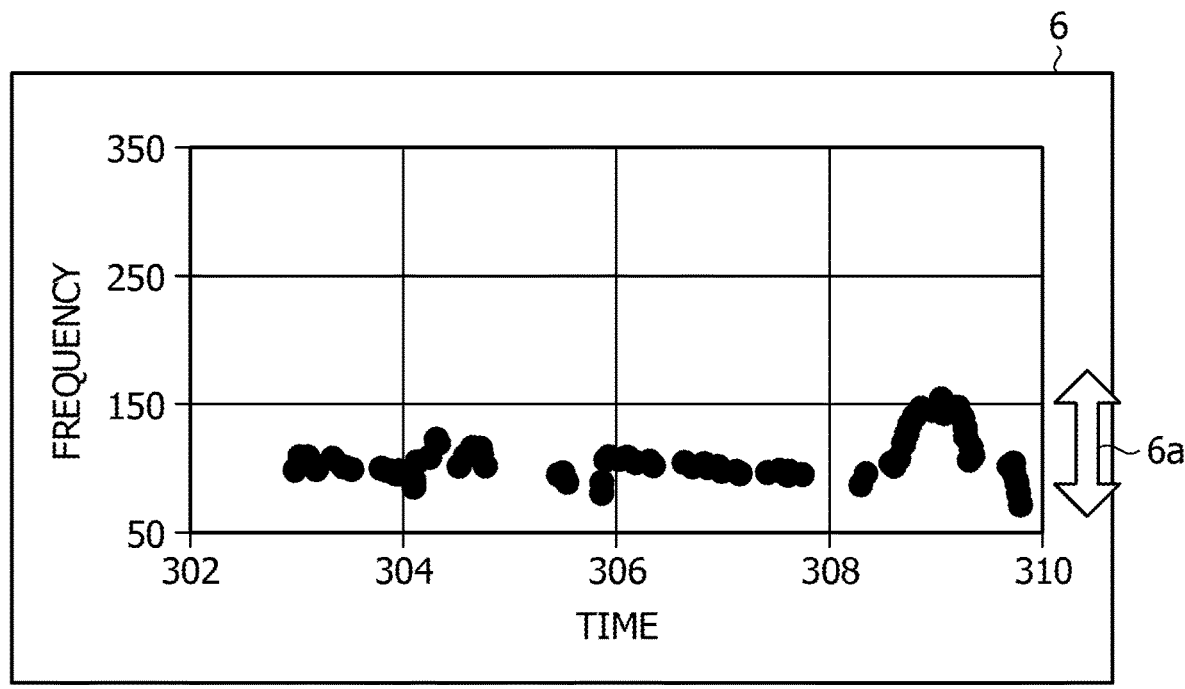
FIG. 16 is a diagram illustrating a graph in a case where an accurate pitch frequency is calculated.
Figure 17:
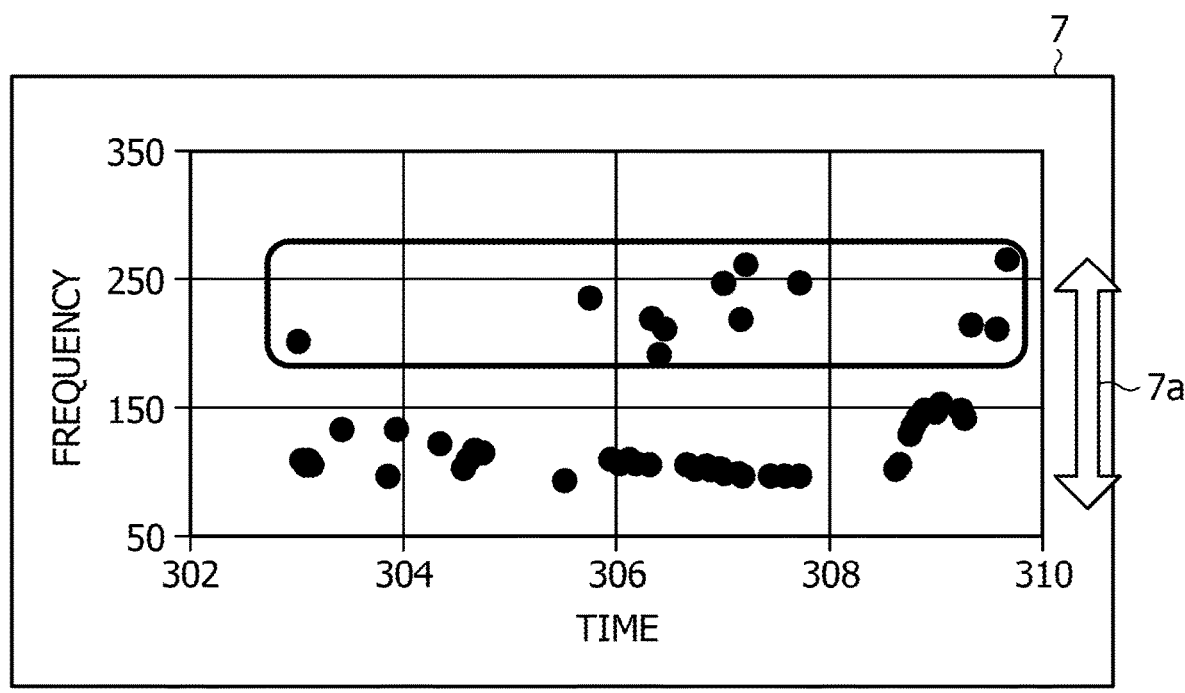
FIG. 17 is a diagram illustrating a graph in a case where a half pitch/a double pitch are calculated.

Next, an example of a hardware configuration of a computer that realizes the same function as the voice evaluation apparatuses 100, 200, and 400 illustrated in the above-described embodiments will be described. FIG. 14 is a diagram illustrating the example of the hardware configuration of the computer that realizes the same functions as the voice evaluation apparatuses.

As illustrated in FIG. 14, a computer 500 includes a CPU 501 that executes various types of arithmetic process, an input apparatus 502 that receives an input of data from a user, and a display 503. The computer 500 includes a reading apparatus 504 that reads a program or the like from a storage medium, and an interface apparatus 505 that exchanges data with a recording apparatus or the like via a wired or wireless network. The computer 500 includes a RAM 506 that temporarily stores various types of information and a hard disk apparatus 507. The respective apparatuses 501 to 507 are connected to a bus 508.

The hard disk device 507 includes a pitch detection program 507a, a distribution calculation program 507b, a spread calculation program 507c, an estimation program 507d, and an evaluation program 507e. The CPU 501 reads the pitch detection program 507a, the distribution calculation program 507b, the spread calculation program 507c, the estimation program 507d, and the evaluation program 507e and develops the programs in the RAM 506.

The pitch detection program 507a functions as a pitch detection process 506a. The distribution calculation program 507b functions as a distribution calculation process 506b. The spread calculation program 507c functions as a spread calculation process 506c. The estimation program 507d functions as an estimation process 506d. The evaluation program 507e functions as an evaluation process 506e.

A process of the pitch detection process 506a corresponds to the process of the pitch detection units 110, 210, and 320. The distribution calculation process 506b corresponds to the process of the distribution calculation units 111, 211, and 411. A process of the spread calculation process 506c corresponds to the process of the spread calculation units 112, 212, and 412. The estimation process 506d corresponds to the process of the estimation units 114, 214, and 414.

The programs 507a to 507e may not be stored necessarily in the hard disk apparatus 507 from the beginning. For example, the respective programs are stored in a "portable physical medium" such as a flexible disk (FD), a CD-ROM, a DVD disk, a magnetooptic disk, an IC card or the like which is inserted into the computer 500. The computer 500 may read and execute the programs 507a to 507e.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a program that causes a computer to execute a process for evaluating a voice, the process comprising:
   analyzing a voice signal to detect a pitch frequency;
   selecting an evaluation target region to be evaluated in the detected pitch frequency based on a distribution of a detection rate of the detected pitch frequency;
   correcting the distribution by multiplying a pitch frequency corresponding to a central portion of the distribution by a first weight and multiplying a pitch frequency corresponding to a tail portion of the distribution by a second weight smaller than the first weight;
   evaluating impression of the voice based on a spread of the corrected distribution of the detection rate and the selected evaluation target region; and
   determining the impression of the voice is good when a spread of the distribution is larger than or equal to a certain threshold.

2. The recording medium according to claim 1, wherein the process further comprising
   estimating a reference distribution of a detection rate of a speaker in a normal time based on a pitch frequency that is obtained by analyzing a voice signal within a predetermined section,
   wherein, in the evaluating, impression of a voice is evaluated based on the reference distribution and the corrected distribution.

3. The recording medium according to claim 2, wherein the process further comprising
   storing the reference distribution and speaker information in a storage apparatus in association with each other,
   wherein, in the evaluating, a reference distribution associated with the speaker information is selected, and impression of a voice is evaluated based on a spread of the selected reference distribution and a spread of the corrected distribution.

4. The recording medium according to claim 3,
   wherein, in the estimating the reference distribution, when a reference distribution associated with designated speaker information is stored in the storage apparatus, the reference distribution associated with the designated speaker information and stored in the storage apparatus is set to an initial value in the estimating the reference distribution.

5. The recording medium according to claim 1,
   wherein, in the detecting the pitch frequency, any one of a pitch frequency at each time, an average pitch frequency within a predetermined period of time, an upper limit pitch frequency, and a lower limit pitch frequency is detected.

6. The recording medium according to claim 1,
   wherein, in the correcting the distribution, a statistical quantity of any one of a variance, a standard deviation, a range, a sum of squares, and an interquartile range, relating to a plurality of pitch frequencies is calculated and, in the evaluating, impression of a voice is evaluated based on the statistical quantity.

7. The recording medium according to claim 1,
   wherein, in the correcting the distribution, the central portion of the distribution and the tail portion of the distribution are specified based on a plurality of pitch frequencies in a predetermined section.

8. The recording medium according to claim 1,
   wherein, in the evaluating, a voice is evaluated for each of a plurality of speakers, and a whole conversation of the plurality of speakers is evaluated.

9. The recording medium according to claim 1,
   wherein, in the evaluating, impression of each voice at each time is evaluated, and a score regarding each evaluation result is calculated.

10. A voice evaluation method executed by a computer, the voice evaluation method comprising:
    analyzing a voice signal to detect a pitch frequency;
    selecting an evaluation target region to be evaluated in the detected pitch frequency based on a distribution of a detection rate of the detected pitch frequency;

correcting the distribution by multiplying a pitch frequency corresponding to a central portion of the distribution by a first weight and multiplying a pitch frequency corresponding to a tail portion of the distribution by a second weight smaller than the first weight;

evaluating impression of the voice based on a spread of the corrected distribution of the detection rate and the selected evaluation target region; and determining the impression of the voice is good when a spread of the distribution is larger than or equal to a certain threshold.

11. A voice evaluation apparatus comprising:

a memory; and a processor coupled to the memory and configured to:

analyze a voice signal to detect a pitch frequency; and select an evaluation target region to be evaluated in the detected pitch frequency based on a distribution of a detection rate of the detected pitch frequency, correct the distribution by multiplying a pitch frequency corresponding to a central portion of the distribution by a first weight and multiplying a pitch frequency corresponding to a tail portion of the distribution by a second weight smaller than the first weight;

evaluate impression of the voice based on a spread of the corrected distribution of the detection rate and the selected evaluation target region; and determining the impression of the voice is good when a spread of the distribution is larger than or equal to a certain threshold.

12. The voice evaluation apparatus according to claim 11, wherein the processor is configured to:

estimate a reference distribution of a detection rate of a speaker in a normal time based on a pitch frequency that is obtained by analyzing a voice signal within a predetermined section, and evaluate impression of a voice based on the reference distribution and the corrected distribution.

13. The voice evaluation apparatus according to claim 12, wherein the processor is configured to:

store the reference distribution and speaker information in a storage apparatus in association with each other, and select a reference distribution associated with the speaker information and evaluates impression of a voice based on a spread of the selected reference distribution and a spread of the corrected distribution.

14. The voice evaluation apparatus according to claim 13, wherein the processor is configured to when a reference distribution associated with designated speaker information is stored in the storage apparatus, set the reference distribution associated with the designated speaker information and stored in the storage apparatus to an initial value in estimating the reference distribution.

15. The voice evaluation apparatus according to claim 11, wherein the processor is configured to detect any one of a pitch frequency at each time, an average pitch frequency within a predetermined period of time, an upper limit pitch frequency, and a lower limit pitch frequency.

16. The voice evaluation apparatus according to claim 11, wherein the processor is configured to calculate a statistical quantity of any one of a variance, a standard deviation, a range, a sum of squares, and an interquartile range, relating to a plurality of pitch frequencies, and the evaluation unit evaluates impression of a voice based on the statistical quantity.

17. The voice evaluation apparatus according to claim 11, wherein the processor is configured to specify the central portion of the distribution and the tail portion of the distribution based on a plurality of pitch frequencies in a predetermined section.

* * * * *